United States Patent
Sutskover et al.

(10) Patent No.: US 10,531,403 B2
(45) Date of Patent: *Jan. 7, 2020

(54) TRANSMIT POWER CONTROL FOR UPLINK TRANSMISSIONS

(71) Applicant: Intel IP Corporation, Santa Clara, CA (US)

(72) Inventors: Ilan Sutskover, Hadera (IL); Laurent Cariou, Portland, OR (US); Yaron Alpert, Hod Hasharoni (IL); Uri Perlmutter, Holon (IL); Assaf Gurevitz, Ramat Hasharon (IL); Ziv Avital, Haifa (IL); Avi Mansour, Haifa (IL); Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/626,243

(22) Filed: Jun. 19, 2017

(65) Prior Publication Data

US 2017/0289926 A1  Oct. 5, 2017

Related U.S. Application Data

(63) Continuation of application No. 15/344,227, filed on Nov. 4, 2016.
(Continued)

(51) Int. Cl.
*H04W 52/32* (2009.01)
*H04W 52/24* (2009.01)
*H04W 52/14* (2009.01)
*H04W 52/36* (2009.01)
(Continued)

(52) U.S. Cl.
CPC ....... *H04W 52/325* (2013.01); *H04W 52/146* (2013.01); *H04W 52/241* (2013.01);
(Continued)

(58) Field of Classification Search
None
See application file for complete search history.

(56) References Cited

U.S. PATENT DOCUMENTS 9,392,599 B2 * 7/2016 Maeda ................. H04W 72/04
10,200,147 B2 * 2/2019 Cariou ................. H04L 1/0043
(Continued)

OTHER PUBLICATIONS

"U.S. Appl. No. 15/344,227, Non Final Office Action dated Oct. 18, 2018", 15 pgs.
"U.S. Appl. No. 15/344,227, Response Filed Jan. 18, 2019 to Non Final Office Action dated Oct. 18, 2018", 10 pgs.

*Primary Examiner* — Xavier Szewai Wong
(74) *Attorney, Agent, or Firm* — Schwegman Lundberg & Woessner, P.A.

(57) ABSTRACT

Methods, apparatuses, computer readable media for uplink transmission power control in a wireless network. An apparatus of a wireless device comprising processing circuitry is disclosed. The processing circuitry is configured to decode a trigger frame from an access point for an uplink communication, the trigger frame comprising an uplink resource allocation for the station, the uplink resource allocation including common information and per station information, the common information including an indication of a maximum receive power at the access point, the per station information comprising an identification of the station, and an indication of a resource unit (RU). The processing circuitry may be further configured to: encode an uplink (UL) physical layer convergence procedure (PLCP) protocol data unit (PPDU)(UL-PPDU) in accordance with the indication of the RU. The processing circuitry may be further configured to: determine a transmit power for the UL-PPDU based on the maximum receive power.

25 Claims, 21 Drawing Sheets

Related U.S. Application Data

(60) Provisional application No. 62/251,460, filed on Nov. 5, 2015, provisional application No. 62/274,967, filed on Jan. 5, 2016.

(51) Int. Cl.
*H04W 52/34* (2009.01)
*H04W 84/12* (2009.01)
*H04W 72/04* (2009.01)

(52) U.S. Cl.
CPC ....... *H04W 52/242* (2013.01); *H04W 52/245* (2013.01); *H04W 52/343* (2013.01); *H04W 52/365* (2013.01); *H04W 72/042* (2013.01); *H04W 84/12* (2013.01)

(56) References Cited

U.S. PATENT DOCUMENTS

| | | |
|---|---|---|
| 2011/0069786 A1 | 3/2011 | Sahara |
| 2011/0077044 A1 | 3/2011 | Sampath et al. |
| 2013/0089062 A1* | 4/2013 | Ahn .................... H04W 52/365 370/329 |
| 2014/0071933 A1 | 3/2014 | Lee et al. |
| 2016/0330755 A1 | 11/2016 | Ding et al. |
| 2016/0345270 A1 | 11/2016 | Homchaudhuri et al. |
| 2016/0360509 A1 | 12/2016 | Seok |
| 2017/0070962 A1* | 3/2017 | Wang .................. H04W 52/241 |
| 2017/0135046 A1 | 5/2017 | Sutskover et al. |
| 2017/0294953 A1* | 10/2017 | Ghosh ................. H04W 72/042 |
| 2017/0303280 A1 | 10/2017 | Chun et al. |
| 2018/0020460 A1* | 1/2018 | Hedayat ............. H04L 27/2602 |

* cited by examiner

TRANSMIT POWER CONTROL FOR UPLINK TRANSMISSIONS

PRIORITY CLAIM

This application is a continuation of U.S. patent application Ser. No. 15/344,227, filed Nov. 4, 2016, which claims the benefit of priority under 35 USC 119(e) to U.S. Provisional Patent Application Ser. No. 62/274,967, filed Jan. 5, 2016, and U.S. Provisional Patent Application Ser. No. 62/251,460, filed Nov. 5, 2015, each of which is incorporated herein by reference in its entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate computer readable media, methods, and apparatuses to transmit power (TXP) control for uplink (UL) transmissions in a wireless network. Some embodiments relate to wireless local area network (WLAN).

BACKGROUND

Efficient use of the resources of a wireless local-area network (WLAN) is important to provide bandwidth and acceptable response times to the users of the WLAN However, often there are many devices trying to share the same resources and the devices may interfere with one another. Additionally, the wireless devices may be moving and the signal quality may be changing. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
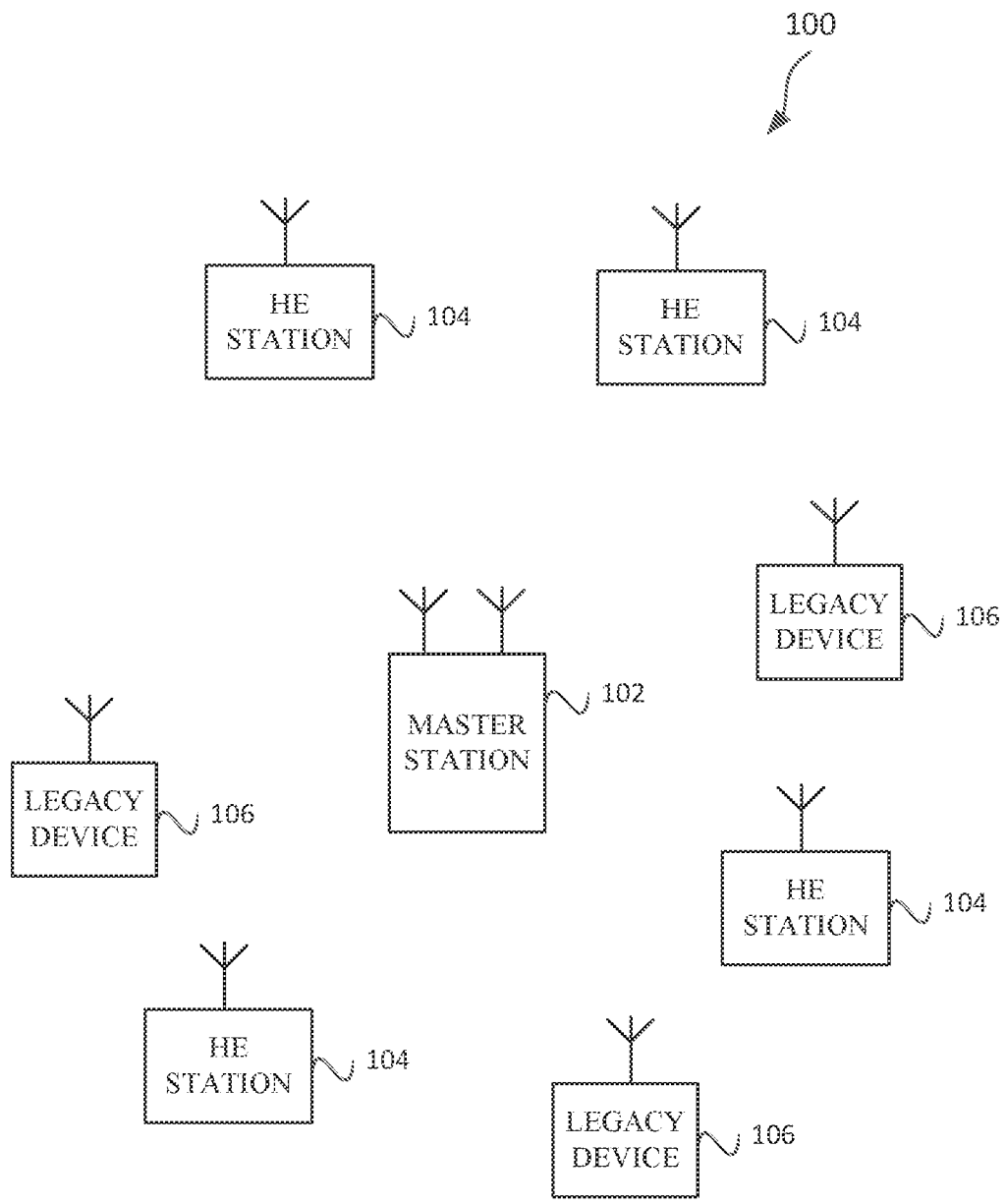
FIG. 1 illustrates a WLAN in accordance with some embodiments.

FIG. 1 illustrates a WLAN 100 in accordance with some embodiments. The WLAN 100 may comprise a basis service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of an extended service set (ESS). A controller (not illustrated) may store information that is common to the more than one master stations 102.

The legacy devices 106 may operate in accordance with one or more of IEEE 802.11a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The HE frame may be a PPDU. In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the master station 102, HE STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856). Long Term Evolution (LTE). Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a master station 102.

In some embodiments, the HE station 104 and/or master station 102 may be configured to operate in accordance with IEEE 802.11mc. A HE station 104 and/or master station 102 may be termed an HE device (e.g., station or AP), if the HE device complies with a wireless communication standard IEEE 802.11ax.

In example embodiments, the HE station 104 and/or the master station 102 are configured to perform the methods and functions described herein in conjunction with FIGS. 1-21.

Figure 2:
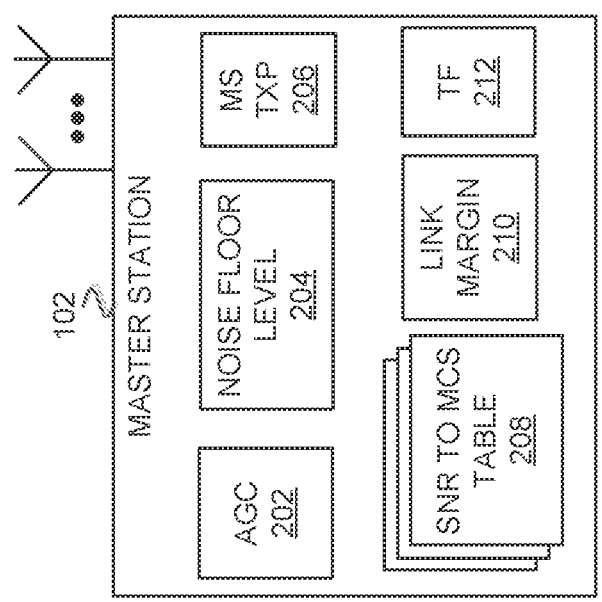
FIG. 2 illustrates a master station in accordance with some embodiments.
Figure 3:
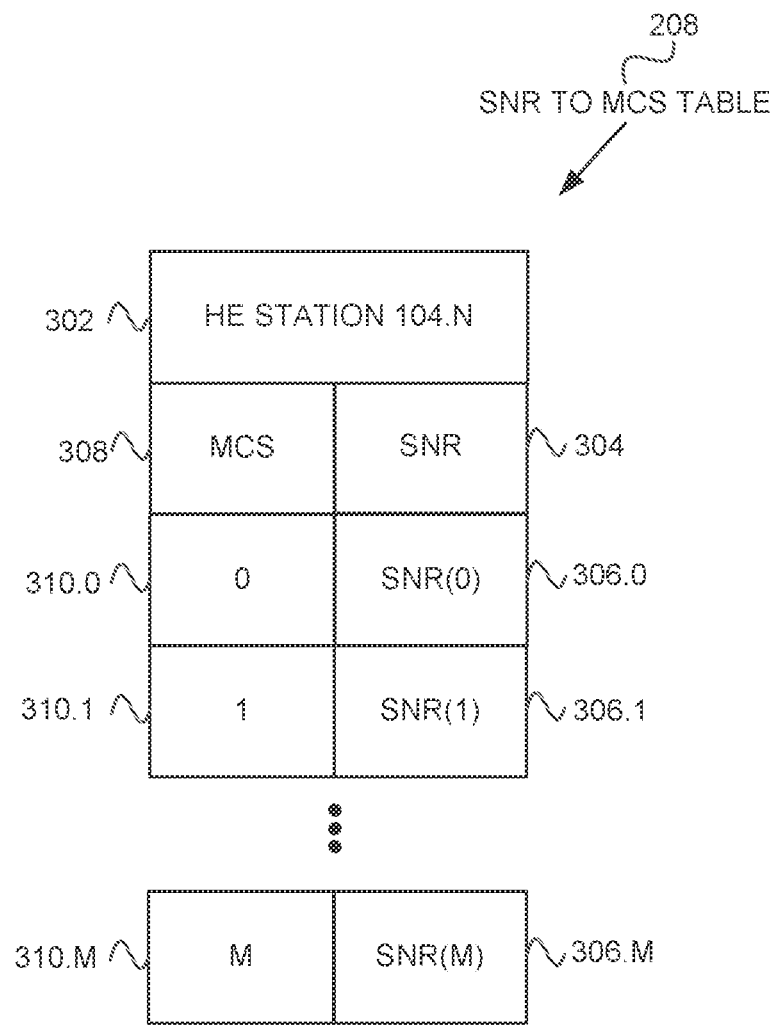
FIG. 3 illustrates a modulation and coding scheme (MCS) to signal to noise ratio (SNR) table in accordance with some embodiments.
Figure 4:
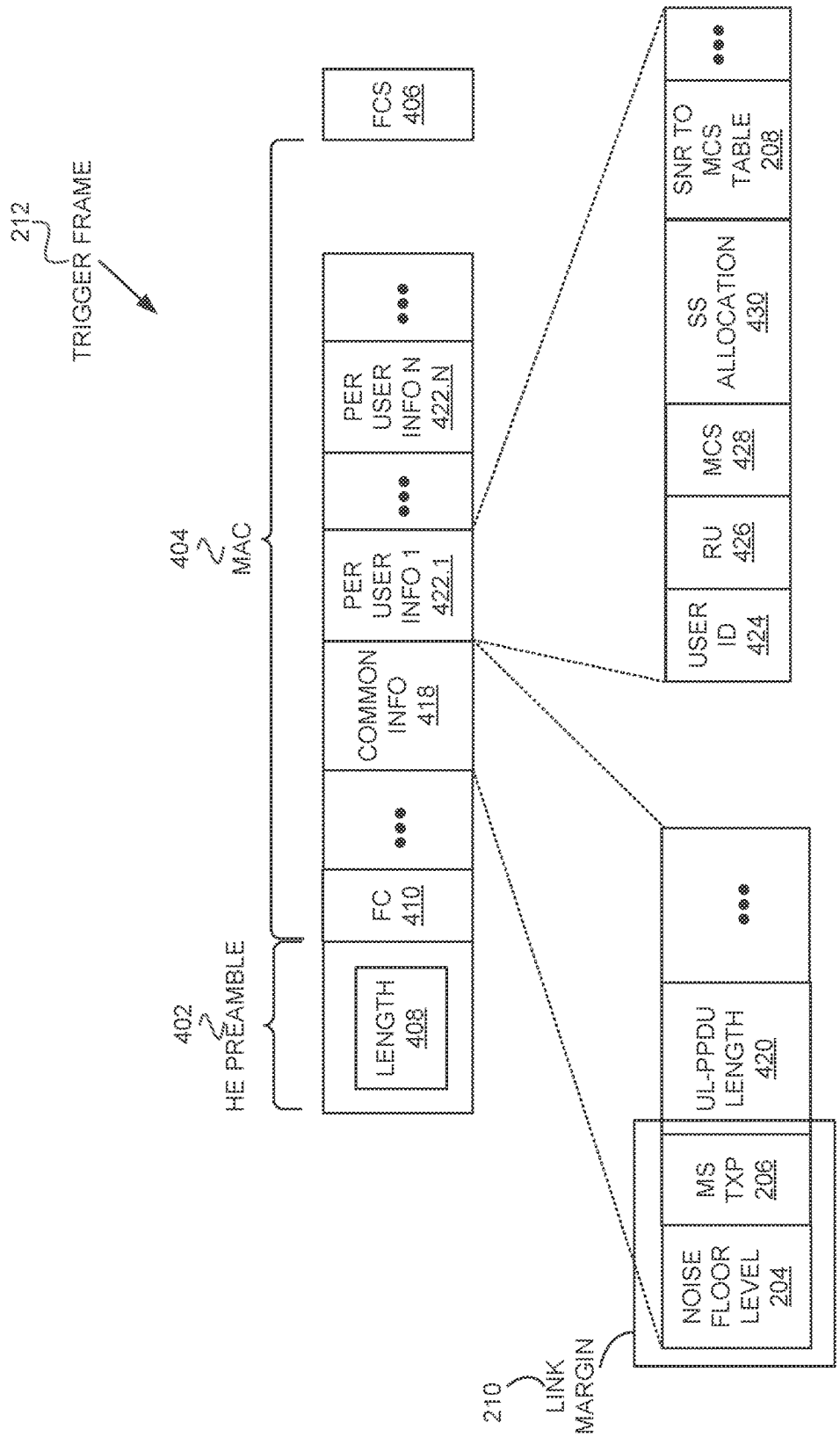
FIG. 4 illustrates a trigger frame (TF) in accordance with some embodiments.

FIG. 2 illustrates a master station 102 in accordance with some embodiments. FIGS. 2-4 are disclosed in conjunction with one another. The master station 102 may include automatic gain control (AGC) 202, noise floor level 204, master station (MS) TXP 206, MCS to SNR table 208, link margin 210, and trigger frame (TF) 212. The AGC 202 may be configured to tune the master station 102 so that the master station 102 is more or less receptive to received signals based on the strength of the signals. The AGC 202 may tune to the strongest signal, so if the power difference between two received signals is too large then the weaker signal may not be received properly.

The noise floor level 204 may be a measure of noise at the master station 102. The noise floor level 204 may be included in a packet transmitted by the master station 102, e.g., trigger frame 212. The MS TXP 206 may be a transmit power used by the master station 102 to transmit a packet, e.g., trigger frame 212.

The MCS to SNR table 208 may be a table that includes a SNR for each MCS for each HE station 104, e.g., see FIG. 3. FIG. 3 illustrates a modulation and coding scheme (MCS) to signal to noise ratio (SNR) table in accordance with some embodiments. Illustrated in FIG. 3 is HE station 104.N 302, SNR 304, MCS 308, SNR(0) 306.0 through SNR(M) 306 M, and 0 310.0 through 310.M. The HE station 104.N 302 is the HE station 104 for which the MCS to SNR table 208 is maintained. The master station 102 may maintain a MCS to SNR table 208 for each HE station 104 related to the master station 102, e.g., for each HE station 104 that is associated with the master station 102. The MCS to SNR table 208 may indicate a SNR 306 for each of the MCSs 310 for a HE station 104.N, where the SNR 306 indicates the SNR the master station 102 needs at the master station 102 to receive a signal from the HE station 104.N with a corresponding MCS 310. In some embodiments, the MCS to SNR table 208 may be in a compressed format, e.g. an SNR of MCS0, and then SNR differences for successive MCSs.

The MCS to SNR table 208 may be sent to the HE station 104, e.g., included in an information element (IE), a resource allocation element (RAE), resource allocation information element (RAIE), or fields of a packet. The master station 102 may send updates to the MCS to SNR table 208 to an HE station 104. The master station 102 may infrequently transmit the MCS to SNR table 208 or updates to the HE stations 104. For example, in some embodiments, the master station 102 may only send the MCS to SNR table 208 when there are significant changes to the MCS to SNR table 208 based on the reception of packets from the HE station 104 corresponding to the MCS to SNR table 208. In some embodiments, the HE station 104 may use the MCS to SNR table 208 at least ten times for each time an update to or the MCS to SNR table 208 is sent to the HE station 104.

The link margin 210 may be the MS TXP 206 plus the noise floor level 204. The master station 102 may determine the link margin 210 and transmit it to one or more HE station 104, e.g., in a trigger frame 212.

Figure 7:
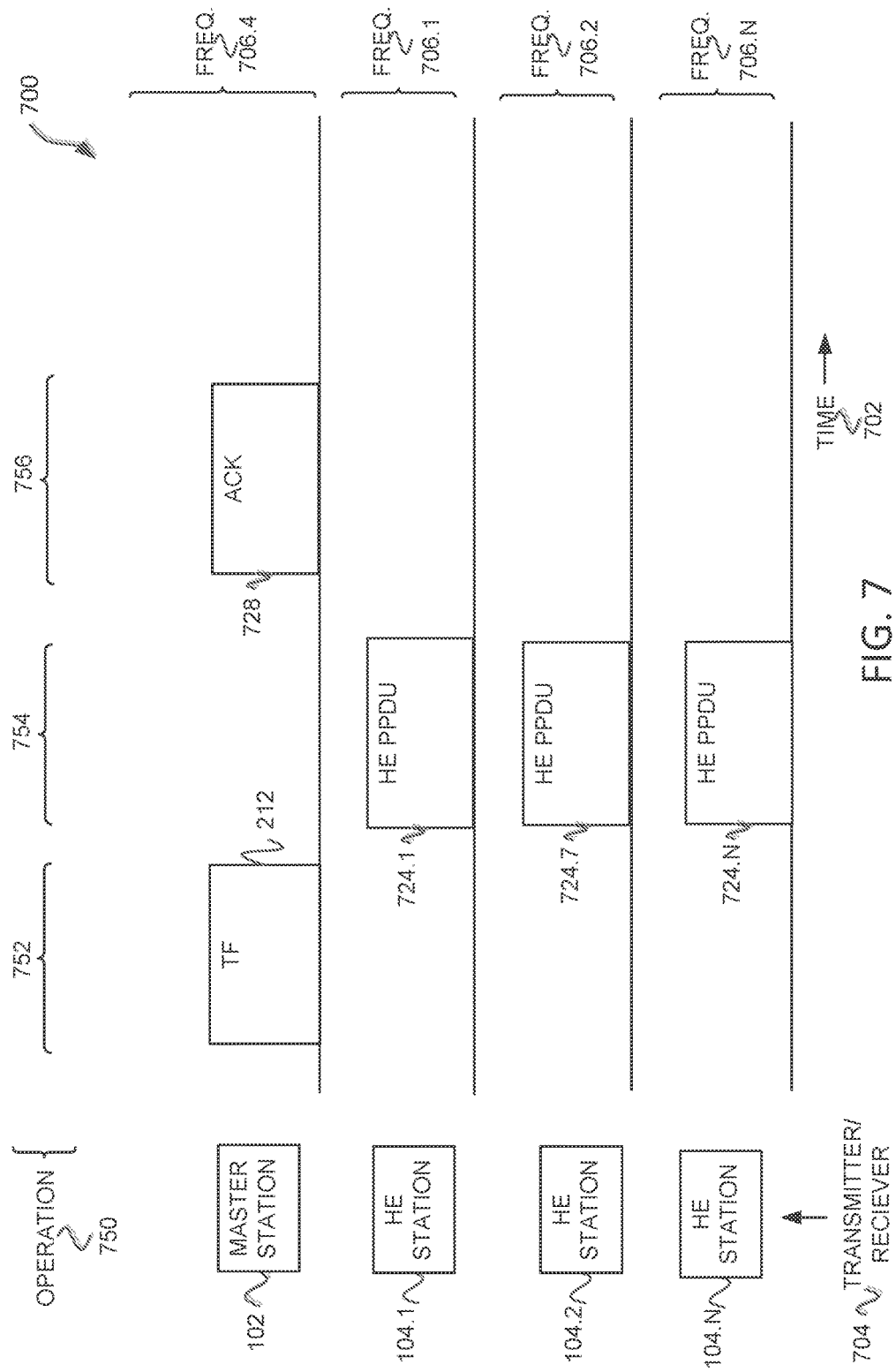
FIG. 7 illustrates a method for TXP control for UL transmissions in accordance with some embodiments.

The TF 212 (FIG. 4) may be a PPDU that initiates one or more UL PPDUs from HE stations 104, e.g., see FIG. 7. The master station 102 may be configured to encode TF 212 and transmit it to one or more HE stations 104.

FIG. 4 illustrates a trigger frame (TF) 212 in accordance with some embodiments. The trigger frame 212 may include HE preamble 402, MAC 404, and FCS 406. The HE preamble 402 may include a length 408 that indicates the length or duration of the trigger frame 212. The MAC 404 may include a frame control (FC) 410, common information 418, and per user information 1 422.1 through per user information N 422.N. The FC 410 may include control information such as protocol version.

The common information 418 may include a noise floor level 204, a MS TXP 206, and an UL PPDU length 420, e.g., the UL PPDU length 420 may indicate a value for the legacy length field for the UL PPDUs 724 (FIG. 7).

In some embodiments, the noise floor level 204 and MS TXP 206 may be included in the trigger frame 212. In some embodiments, the link margin 210 is included in the trigger frame 212. In some embodiments, the link margin 210 is included in the trigger frame 212 and the noise floor level 204 and MS TXP 206 are not included in the trigger frame 212.

The per user information 422 may be included for each HE station 104 that is allocated resources for UL transmission.

The per user information 422 may include a user ID 424, RU 426, MCS 428, SS allocation 430, and MCS to SNR table 208. The user ID 424 may be an identifier of the HE station 104, e.g., an association ID. The RU 426 may indicate a frequency for the HE station 104 to use to transmit UL PPDUs 724. The MCS 428 may indicate an MCS 428 the HE station 104 is to use to encode the UL PPDU 724. The SS allocation 430 may indicate a spatial stream allocation for the HE station 104 to use.

The MCS to SNR table 208 may be optional and may be as described in conjunction with FIGS. 2 and 3. In some embodiments, only the SNR for the MCS 428 may be included in the MCS to SNR table 208. The FCS 406 may include information to enable the receiver of the trigger frame 212 to determine the integrity of the trigger frame 212.

Returning to FIG. 2, the master station 102 may be configured to determine a MCS 428 for each of the HE stations 104 to use to encode the UL PPDUs 724.

Figure 5:
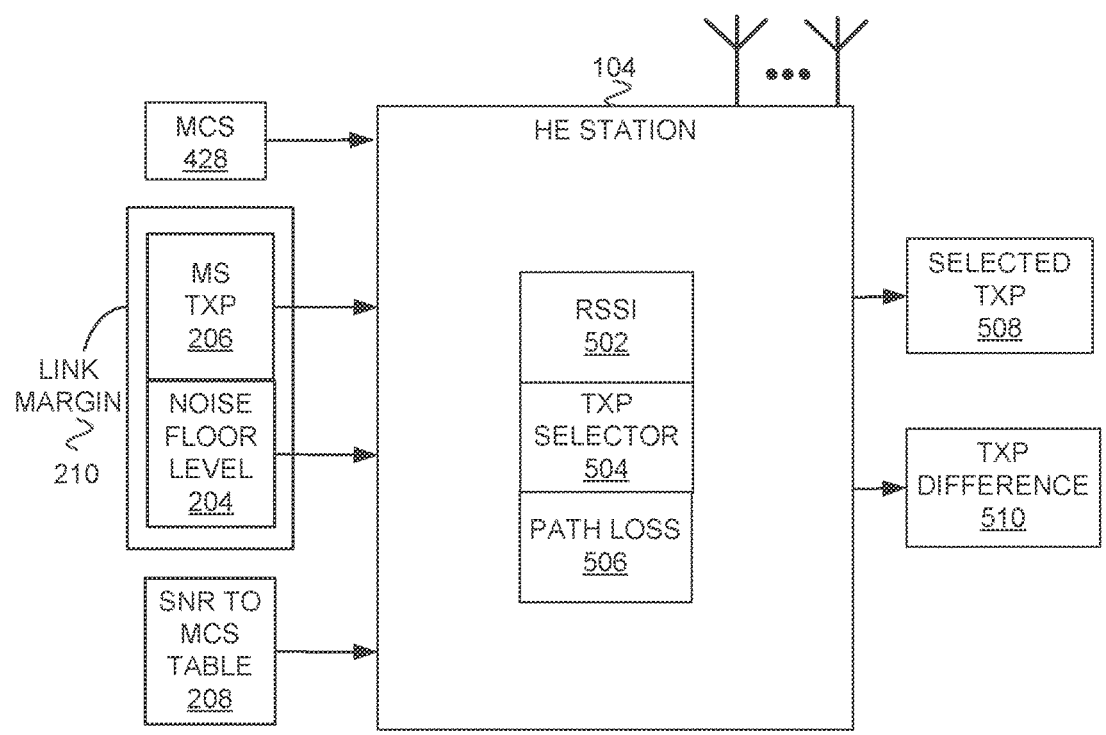
FIG. 5 illustrates a HE station in accordance with some embodiments.

FIG. 5 illustrates a HE station 104 in accordance with some embodiments. Illustrated in FIG. 5 is MCS 428, MS TXP 206, noise floor level 204, link margin 210, MCS to SNR table 208, receive signal strength indicator 502, TXP selector 504, path loss 506, selected TXP 508, and TXP difference 510.

The MCS 428 may be sent in the trigger frame 212 and indicate an MCS the HE station 104 is to use for encoding the UL PPDU 724. The MS TXP 206, noise floor level 204, and/or link margin 210 may be sent in a trigger frame 212. The MS TXP 206 indicates the TXP the master station 102 used to transmit the trigger frame 212. The noise floor level 204 indicates an estimated noise floor level for the reception of the HE PPDU 724 at the master station 102. The link margin 210 may be the MS TXP 206 plus the noise floor level 204. The MCS to SNR table 208 may be the table disclosed in conjunction with FIGS. 1-4, and may be transmitted to the HE station 104 by the master station 102.

The RSSI 502 may be the RSSI for a trigger frame 212. The path loss 506 may be determined by the HE station 104 to be the MS TXP 206 minus the RSSI 502. The HE station 104 may assume that the path loss from the master station 102 to the HE station 104 is the same as the path loss from the HE station 104 to the master station 102.

The TXP selector 504 may be configured to select a selected TXP 508 for the HE station 104 to use to transmit a packet, e.g., the HE PPDU 724. The TXP selector 504 may select a selected TXP 508 based on the noise floor level 204, the SNR 306 (see FIG. 3) corresponding to the MCS (e.g., MCS 428) the HE station 104 is to use to encode a packet, the path loss 506, and/or link margin 210. For example, the selected TXP 508 may be noise floor level 204 plus SNR (communicated with MCS to SNR table 208) of the MCS 428 plus path loss 506.

The TXP difference 510 may indicate a difference from a selected TXP 508 and a TXP the HE station 104 may use to transmit a packet, e.g., HE PPDU 724. For example, the HE station 104 may have constraints on an amount of TXP the HE station 104 may use. For example, the selected TXP 508 may be limited by coexistence of another communication protocol, a proximity detection, thermal conditions, static regulatory requirements, or a specific absorption rate (SAR). The TXP difference 510 may indicate a difference from what the HE station 104 determines should be the selected TXP 508, e.g. based on IEEE 802.11ax, and the actual TXP used to transmit the packet, e.g., HE PPDU 724.

In some embodiments, the HE station 104 may use a lower MCS 428 than indicated in the trigger frame 212 (or by another frame from the master station 102), which may be due to the inability of the HE station 104 to use a TXP needed for the MCS 428 indicated in the trigger frame 212 (or by another frame from the master station 102). The master station 102 may determine that the HE station 104 has used a different MCS 428 based on mis-decoding the HE PPDU 724.

In some embodiments, the HE station 104 may indicate that TXP selector 504 indicates a selected TXP 508 that is too strong or too weak.

In some embodiments, the HE station 104 transmits to the master station 102 its TXP capabilities, e.g. maximum TXP and min TXP per MCS. The master station 102 may assign a TXP for the HE station 104 to use, which may be per MCS.

In some embodiments, the link margin 210 and/or MS TXP 206 may not indicate exactly the TXP the master station 102 used to transmit the packet, e.g., trigger frame 212, but a value associated with the TXP. For example, if the master station 102 has eight antennas, then the master station 102 may choose a single number to represent its TXP which is not exactly the TXP used on any one of the eight antenna, or which is not exactly the TXP used for all of the master station's antennas.

In some embodiments, the master station 102 may update MCS to SNR table 208 and communicate the updates to the HE stations 104. The master station 102 communicating a SNR 310 for each MCS 306 may handle both the short-term control and the long-term control of TXP for the HE station 104 to use.

The TXP difference 510 may be used by the master station 102 to adjust the MCS to SNR table 208 and/or to determine a different MCS 428 for the HE station 104 to use to encode packets.

Figure 6:
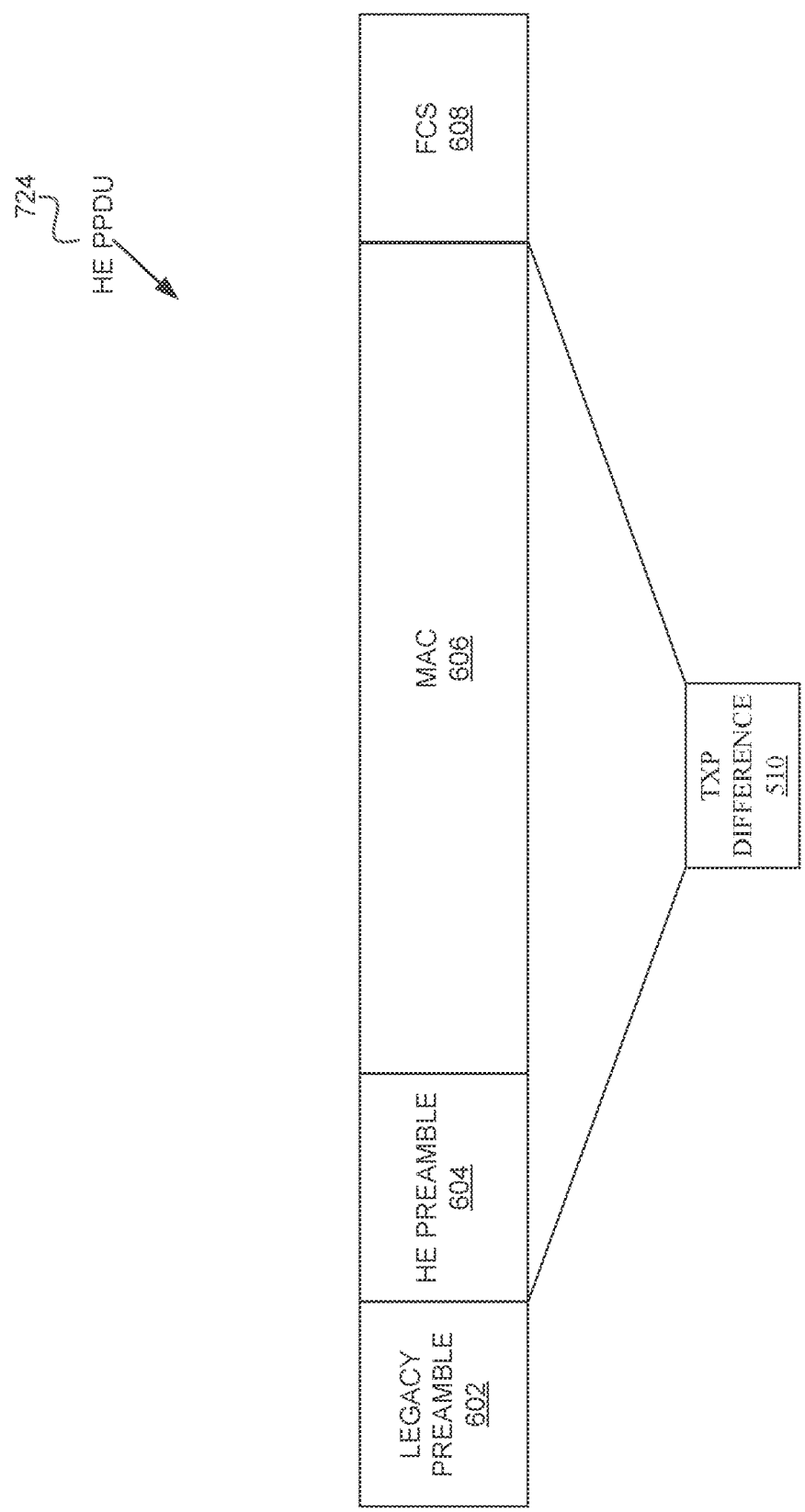
FIG. 6 illustrates a HE physical Layer Convergence Procedure (PLCP) Protocol Data Unit (PPDU) (HE PPDU) in accordance with some embodiments.

FIG. 6 illustrates a HE physical Layer Convergence Procedure (PLCP) Protocol Data Unit (PPDU) (HE PPDU) 724 in accordance with some embodiments. The HE PPDU 724 may be a trigger-based PPDU that is transmitted in response to a trigger frame. The HE PPDU 724 includes a legacy preamble 602, HE preamble 604, MAC 606, and FCS 608. The TXP difference 510 may be included in the HE preamble 604 and/or MAC 606 portion of the HE PPDU 724. In some embodiments, the TXP difference 510 is not included in the HE PPDU 724.

FIG. 7 illustrates a method 700 for TXP control for UL transmissions in accordance with some embodiments. Illustrated in FIG. 7 is time 702 along a horizontal axis, transmitter/receiver 704, frequency 706 along a vertical axis, and operations 750 along the top. The transmitter/receiver 704 may be a master station 102 or a HE station 104. The frequency 706 may be a channel, e.g. less than 20 MHz, 20 MHz, 40 MHz, 80 MHz, 160 MHz, 320 MHz, or another bandwidth. The frequencies 706 may overlap. For example, two HE stations 104 may be allocated the same frequencies 706 for MU-MIMO or a HE station 104 may use the same frequency 706.4 for a HE PPDU 224 as the master station 102 uses for TF 212.

The method 700 begins at operation 752 with the master station 102 transmitting TF 212. For example, master station 102 (FIG. 2) may encode TF 212 and transmit the TF 212 to the HE stations 104.1 through HE stations 104.N.

As disclosed in conjunction with FIGS. 1-6, the master station 102 may determine the MCS 428 based on one or more of MCS to SNR table 208, link margin 210, noise floor level, AGC 202, and/or MS TXP 206.

The method 700 continues at operation 754 with the HE stations 104 transmitting HE PPDU 724. A HE station 104 (e.g., FIG. 5) may determine the selected TXP 508 and, in some embodiments, TXP difference 510 based on one or more of MCS 428, MS TXP 206, noise floor level 204, the MCS to SNR table 208 for the HE station 104, link margin 210, RSSI 502, and/or path loss 506.

The method 700 may continue at operation 756 with the master station 102 transmitting ACKs 728. The master station 102 may adjust the MCS to SNR table 208 based on the received HE PPDUs 724, e.g., the TXP difference 510, the RSSI of the HE PPDUs 724, a number of errors in receiving the HE PPDUs 724, etc. The master station 102 may transmit an updated MCS to SNR table 208 to one or more of the HE stations 104.

Figure 8:
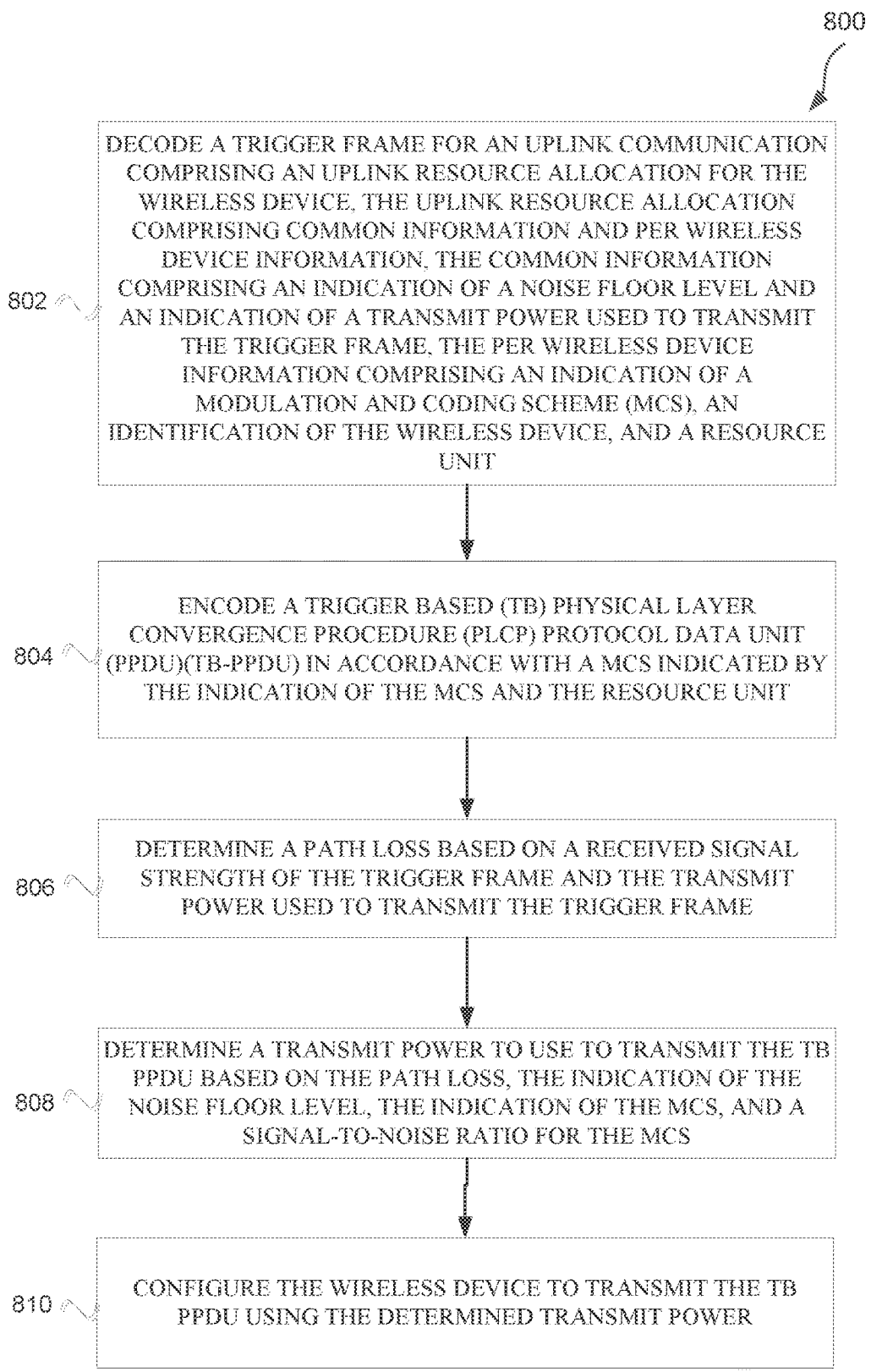
FIG. 8 illustrates a method for TXP control for UL transmissions in accordance with some embodiments.

FIG. 8 illustrates a method 800 for TXP control for UL transmissions in accordance with some embodiments. The method 800 begins at operation 802 with decoding a trigger frame for an uplink communication including an uplink resource allocation for the wireless device, the uplink resource allocation including common information and per wireless device information, the common information including an indication of a noise floor level and an indication of a transmit power used to transmit the trigger frame, the per wireless device information comprising an indication of a modulation and coding scheme (MCS), an identification of the wireless device, and a resource unit.

For example, HE stations 104 of FIG. 7, may decode TF 212, which may include uplink resource allocations. The uplink resource allocation including common information 418 and per wireless device information (e.g., per user information 422), the common information may include noise floor level 204 and MS TXP 206. The per user information 422 may include a MCS 428, user ID 424, and a RU 426.

The method 800 may continue at operation 804 with encoding a TB TB-PPDU in accordance with a MCS indicated by the indication of the MCS and the resource unit. For example, HE stations 104 of FIGS. 5 and 7, may encode HE PPDUs 724 in accordance with the respective MCS 428 and RU 426.

The method 800 may continue at operation 806 with determining a path loss based on a received signal strength of the trigger frame and the transmit power used to transmit the trigger frame. For example, HE station 104 of FIGS. 5 and 7 may determine a path loss 506 based on the RSSI 502 of the TF 212 and the MS TXP 206.

The method 800 may continue at operation 808 with determining a transmit power to use to transmit the TB PPDU based on the path loss, the indication of the noise floor level, the indication of the MCS, and a signal-to-noise ratio for the MCS. In some embodiments, the signal-to-noise ratio for the MCS is communicated to the HE station 104 in a packet from the master station 102 prior to the reception of the trigger frame. In some embodiments, the trigger frame includes the signal-to-noise ratio for the MCS. For example, HE stations 104 of FIGS. 5 and 7 may determine selected TXP 508 based on the path loss 506, the noise floor level 204, the MCS 428, and the MCS to SNR table 208. The MCS to SNR table 208 may be received from the master station 102.

The method 800 may continue at operation 810 with configuring the wireless device to transmit the TB PPDU using the determined transmit power. For example, an apparat of an HE station 104 may configure the HE station 104 to transmit the TB PPDU 724. Each of the operations of method 800 may be performed by an apparatus of the HE station 104.

Figure 9:
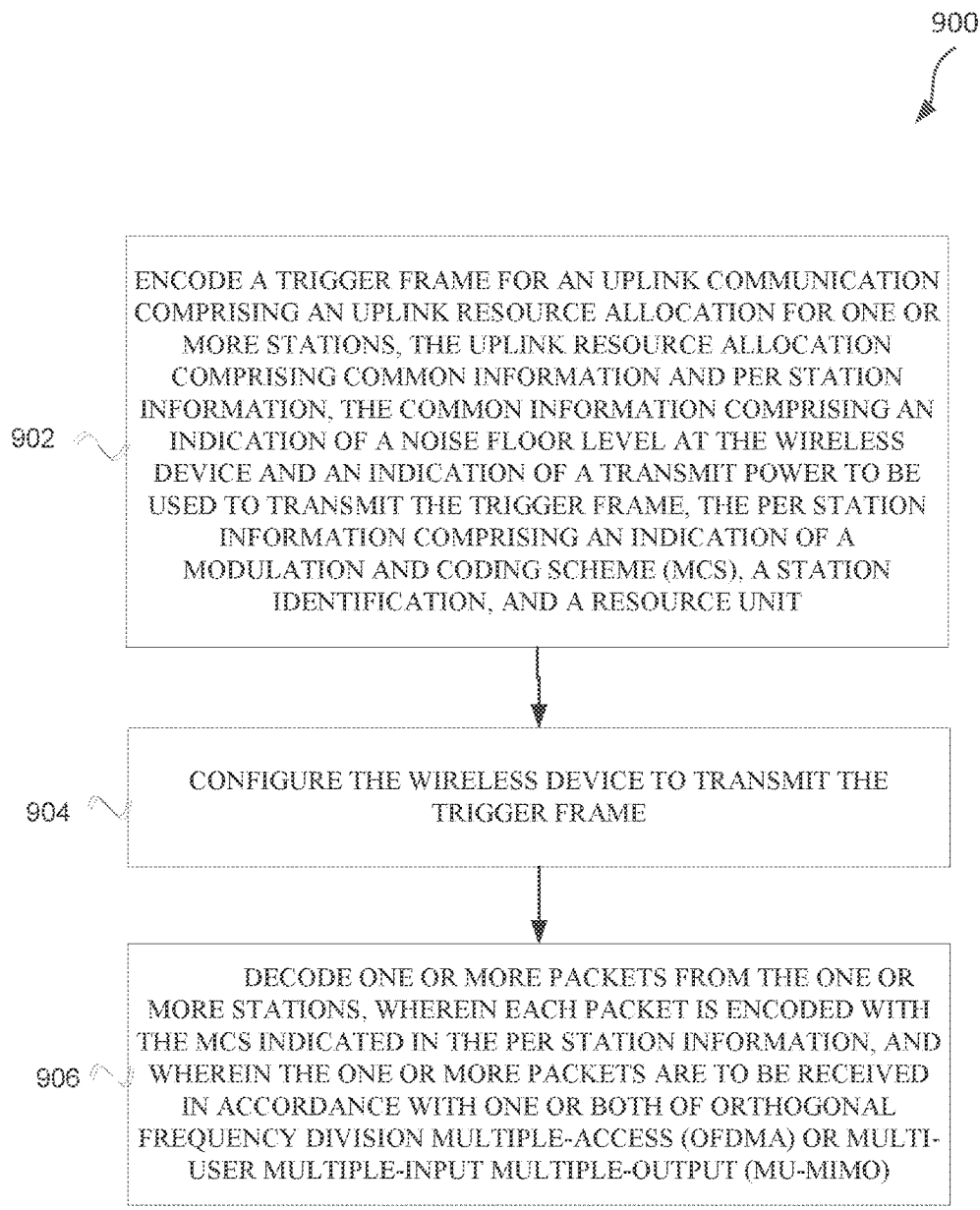
FIG. 9 illustrates a method for TXP control for UL transmissions in accordance with some embodiments.

FIG. 9 illustrates a method 900 for TXP control for UL transmissions in accordance with some embodiments. The method 900 begins at operation 902 with encoding a trigger frame for an uplink communication including an uplink resource allocation for one or more stations, the uplink resource allocation including common information and per station information, the common information including an indication of a noise floor level at the wireless device and an indication of a transmit power to be used to transmit the trigger frame, the per station information including an indication of a modulation and coding scheme (MCS), a station identification, and a resource unit. In some embodiments, the indication of the noise floor level at the wireless device, the indication of the transmit power to be used to transmit the trigger frame, the indication of the MCS, and a signal-to-noise ratio (SNR) values configure the one or more stations to determine a transmit power for the uplink communication.

For example, master station 102 may configure TF 212 to include common information 418 and per user information 422, where the common information includes a noise floor level 204 and a MS TXP 206. The per user information may include a MCS 428, a user ID 424, and a RU 426. The noise floor level 204, MS TXP 206, MCS 428, and the MCS to SNR table 208 may configure the HE stations 104 (see, e.g., FIG. 5 and the accompany disclosure) to determine the selected TXP 508.

The method 900 continues at operation 904 with configuring the wireless device to transmit the trigger frame. For example, an apparatus of the master station 102 may configure the master station 102 to transmit TF 212 (see FIG. 7).

The method 900 continues at operation 906 with decoding one or more packets from the one or more stations, where each packet is encoded with the MCS indicated in the per station information, and wherein the one or more packets are to be received in accordance with one or both of orthogonal frequency division multiple-access (OFDMA) or multi-user multiple-input multiple-output (MU-MIMO).

For example, master station 102 may decode HE PPDUs 724. In some embodiments, the HE PPDUs 724 are received with a power that is based on the indication of the noise floor level at the wireless device, the indication of the transmit power to be used to transmit the trigger frame, the indication of the MCS, and signal-to-noise ratio (SNR) values that configure the one or more stations to determine the transmit power for the HE PPDUs 724. Each of the operations of method 900 may be performed by an apparatus of the master station 102.

Figure 10:
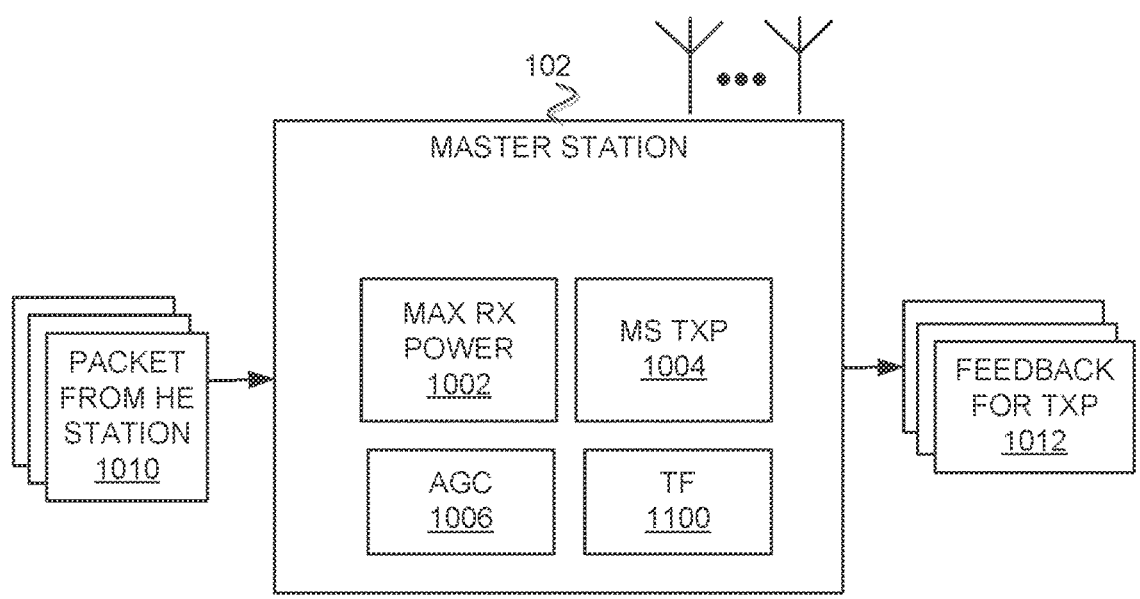
FIG. 10 illustrates a master station in accordance with some embodiments.

FIG. 10 illustrates a master station 102 in accordance with some embodiments. The master station 102 may include maximum (MAX) receive (RX) power 1002, MS TXP 1004, AGC 1006, and trigger frame 1100. The AGC 1006 may be configured to tune the master station 102 so that the master station 102 is more or less receptive to received signals based on the strength of the signals. If the power difference between two received signals is large, then the AGC 1006 may tune to the strongest signal, so if the power difference between two received signals is too large then the weaker signal may not be received properly. The AGC 1006 may control a low noise amplifier (LNA) that has steps that determine a range of power for tuning the master station 102.

The maximum receive power 1002 may be a limit that is set by the master station 102 that determines a maximum receive power for the reception of packets from HE stations 104. The master station 102 may communicate the maximum receive power 1002 to the HE stations 104, e.g., in trigger frames, beacons, acknowledgements, block acknowledgements, etc. The maximum receiver power 1002 may apply to all associated HE stations 104, in accordance with some embodiments. The HE stations 104 may be configured to transmit packet from HE station 1010 at any power as long as the power received at the master station 102 is below (or at in some embodiments) the maximum receive power 1002.

The MS TXP 1004 is the power the master station 102 used to transmit a packet, e.g., a trigger frame. In some embodiments, the MS TXP 1004 may be included in some packets such as a trigger frame.

The packet from HE station 1010 is a packet received from the HE station 104, e.g., a TB PPDU or NDP. The feedback for TXP 1012 is the received power of the packet from the HE station 1010. The feedback for TXP 1012 may be used for the HE stations 104 to calibrate how much power to use to transmit the packet from HE station 1010 in order to be received at MS 102 at a desired power.

In some embodiments, the master station 102 may over-report the feedback for TXP 1012 to a HE station 104 so that the HE station 104 reduces the transmit power more than it would if the feedback for TXP 1012. This may enable the master station 102 to get a HE station 104 that may be causing interference to other HE stations 104 to reduce its transmit power without changing the MAX RX power 1002. In some embodiments, the feedback for TXP 1012 is the RSSI of the packet from HE station 1010.

In some embodiments, the master station 102 may determine that one or more HE stations 104 cannot raise or lower their transmit power to meet the MAX RX power 1002 in which case the master station 102 may change the MAX RX power 1002. In some embodiments, the master station 102 may determine the MAX RX power 1002 based on one or more of: feedback for TXP 1012 from packet from HE stations 1010, RX PWR for MAX TX 1306 (which would be determined by the master station 102, and a determination that a HE station 104 may not contribute a significant amount to the received power at the master station 102. The master station 102 may periodically determine a new MAX RX power 1002 based on analyzing performance of the packets from HE stations 1010.

Figure 11:
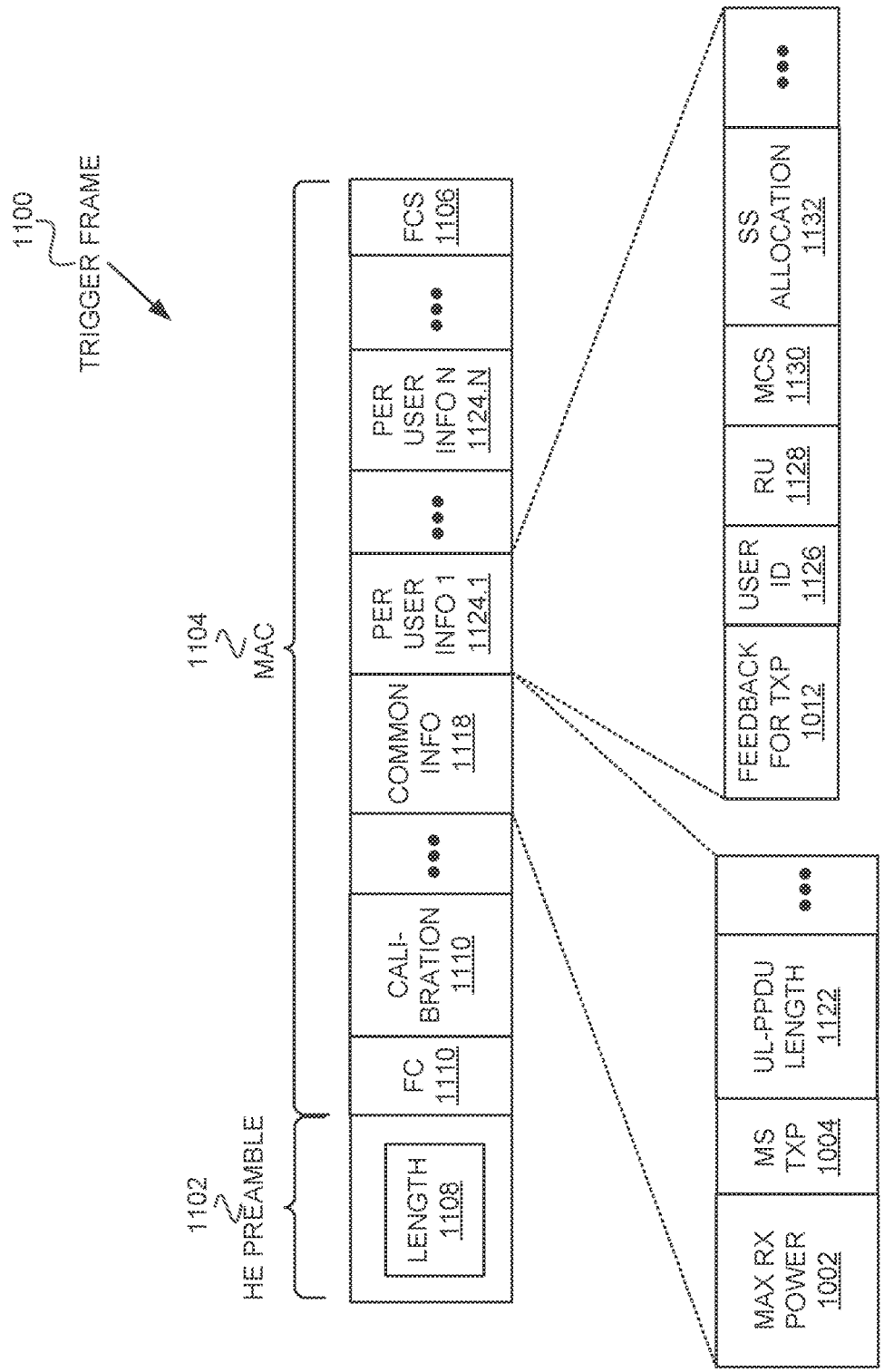
FIG. 11 illustrates a trigger frame in accordance with some embodiments.

FIG. 11 illustrates a trigger frame 1100 in accordance with some embodiments. The trigger frame 1100 may include HE preamble 1102, MAC 1104, and FCS 1106. The HE preamble 1102 may include a length 1108 that indicates the length or duration of the trigger frame 1100. The MAC 1104 may include a frame control (FC) 1110, calibration 1110, common information 1118, and per user information 1 1124.1 through per user information N 1124.N. The FC 1110 may include control information such as protocol version.

The calibration 1110 may indicate that the trigger frame 1100 is for soliciting null data packets (NDPs) from the HE stations 104. The calibration 1110 may be a bit to indicate that the trigger frame is for calibration. In some embodiments, the calibration 1110 may indicate that a subsequent packet will include the feedback for TXP 1012. In some embodiments, the calibration 1110 may be part of the HE preamble 1102.

The common information 1118 may include a MAX RX power 1002, a MS TXP 1004, and an UL PPDU length 1122, e.g., the UL PPDU length 1122 may indicate a value for the legacy length field for the UL PPDUs (e.g., TB PPDUs).

In some embodiments, MAX RX TXP 1002 may be included in the trigger frame 1100. In some embodiments, the MS TXP 1004 may be included in the trigger frame 1100. The HE stations 104 may use the MS TXP 1004 to determine a path loss between the master station 102 and the HE stations 104 and may be configured to estimate the path loss from the HE station 104 to be the path loss between the master station 102 and the HE station 104.

The per user information 1124 may be included for each HE station 104 that is allocated resources for UL transmission. The per user information 1124 may include feedback for TXP 1012, a user ID 1126, RU 1128, MCS 1130, and SS allocation 1132. The user ID 1126 may be an identifier of the HE station 104, e.g., an association ID The RU 1128 may indicate a frequency for the HE station 104 to use to transmit UL PPDUs (e.g., TB PPDUs). The MCS 1130 may indicate an MCS 1130 the HE station 104 is to use to encode the UL PPDU. The SS allocation 1132 may indicate a spatial stream allocation for the HE station 104 to use. In some embodiments, the trigger frame 1100 include feedback for TXP 1012, which is an indication of the received power at the master station 102 from a previous packet from the HE station 104 corresponding to the per user information 1124. In some embodiments, the feedback for TXP 1012 may be a recommended transmit power for the HE station 104 to use.

The FCS 1106 may include information to enable the receiver of the trigger frame 1100 to determine the integrity of the trigger frame 1100.

Figure 12:
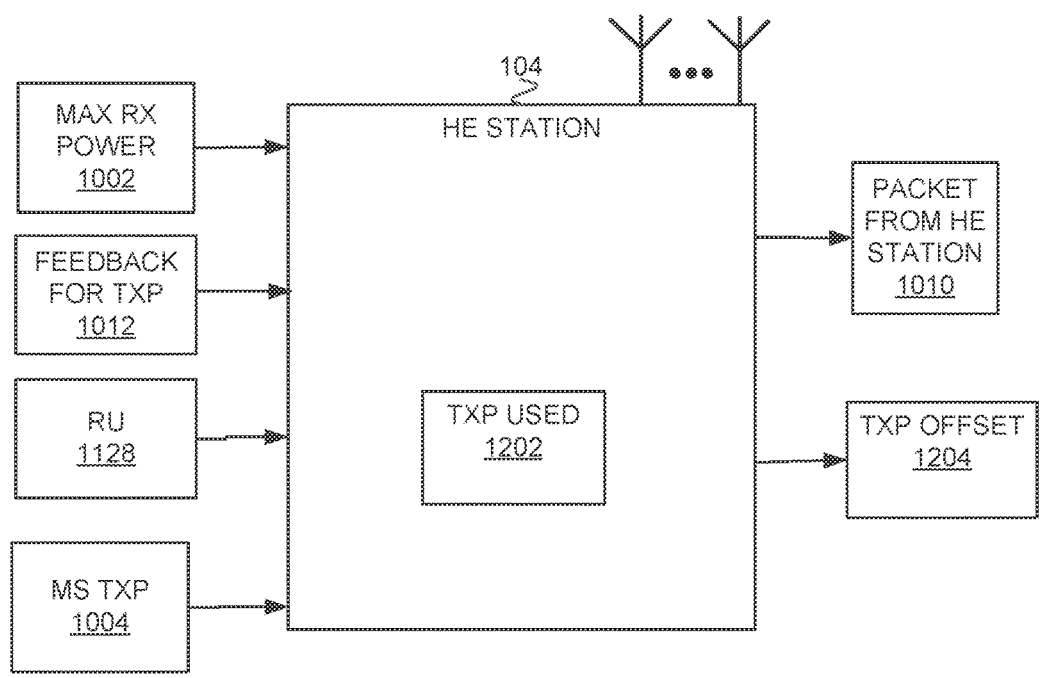
FIG. 12 illustrates a HE station in accordance with some embodiments.

FIG. 12 illustrates a HE station 104 in accordance with some embodiments. The HE station 104 may include a MAX RX power 1002, feedback for TXP 1012, RU 1128, MS TXP 1004, TXP used 1202, packet from HE station 1010, and TXP offset 1204.

The TXP used 1202 may be the transmit power used to transmit the packet from HE station 1010, e.g., HE PPDU, TB PPDU, NDP, etc.

The packet from HE station 1010 may be a packet that the HE station 104 transmitted using TXP used 1202. The feedback for TXP 1012 may be from a master station 102 that indicates a received power of the packet from HE station 1010. The MAX RX power 1002 may indicate a maximum receive power 1002 that is permitted for the total receive power from all the HE stations 1010 at the master station 102. The MAX RX power 1002, in accordance with some embodiments, is not a target RSSI at the master station 102, but a limit RSSI at the master station 102. In some embodiments, the HE station 102 may receive a MS TXP 1004 in a packet from the master station 102. The HE station 104 may be configured to determine a RSSI for the packet and determine a path loss, and then infer a path loss from the HE station 104 to the master station 102 to determine a TXP used 1202 for packet from HE station 1010 so that the received power of the packet from HE station 1010 at the master station 102 does not exceed a proportion of the MAX RX power 1002 for the packet from HE station 1010. The HE station 102 may be configured to use any TXP used 1202 so long as it does not violate the MAX RX power 1002 requirement.

In some embodiments, the HE station 104 may transmit a TXP offset 1204 that indicates a difference between the TXP used 1202 and one or both of a lesser power that the HE station 102 could use to transmit packet from HE station 1010 and a greater transmit power the HE station 104 could use to transmit packet from HE station 1010.

The HE station 102 may use the feedback for TXP 1012 to calibrate the TXP used 1202 so that the HE station 104 can determine a receive power at the master station 102 for a given TXP used 1202. The HE station 104 may use the calibration to not exceed the MAX RX power 1002 requirement.

The TXP used 1202 may be adjusted based on an RU 1128 and/or SS allocation 1132.

In some embodiments the master station 102 is not determining the transmit power that is used by each HE station 104. This may lead to a fair or fairer loose-controlled approach where the HE stations 104 may choose the TXP used 1202 as long they conform to the MAX RX power 1002.

In some embodiments the HE stations 104 receiving feedback for TXP 1012 enables the HE station 104 to map a predicted receive power at the master station 102 for a given TXP used 1202. This may enable the HE station 104 to more accurately determine the TXP used 1202 than if the master station 102 was to send an absolute number for the TXP used 1202. This may be due to the HE station 104 may not being calibrated so that the actual transmit power of the HE station 104 may be different than an intended transmit power.

In some embodiments, the HE station 104 being able to determine the TXP used 1202 may enable the HE station 104 to more easily comply with other constraints on the TXP used 1202, e.g., coexistence of another wireless protocol, SAR, and regulatory constraints.

In some embodiments, the HE station 104 is configured to transmit the packet for HE station 1010 using it highest TX power (TXP used 1202) that conforms to EVM (error vector magnitude), which may be different for different MCSs 1130, mask requirements, and other constraints such regulatory constraints.

In some embodiments, the HE station 104 may include a default SNR to MCS table 208. In some embodiments, the HE station 104 may be configured to select the signal-to-noise ratio for the MCS using the default SNR to MCS table, if a time period between receiving the SNR to MCS table 208 from the master station 102 and receiving a trigger frame (or needing to use the SNR to MCS table 208) is greater than a threshold, then the HE station 104 may select the signal-to-noise ratio for the MCS using a default SNR to MCS table.

Figure 13:
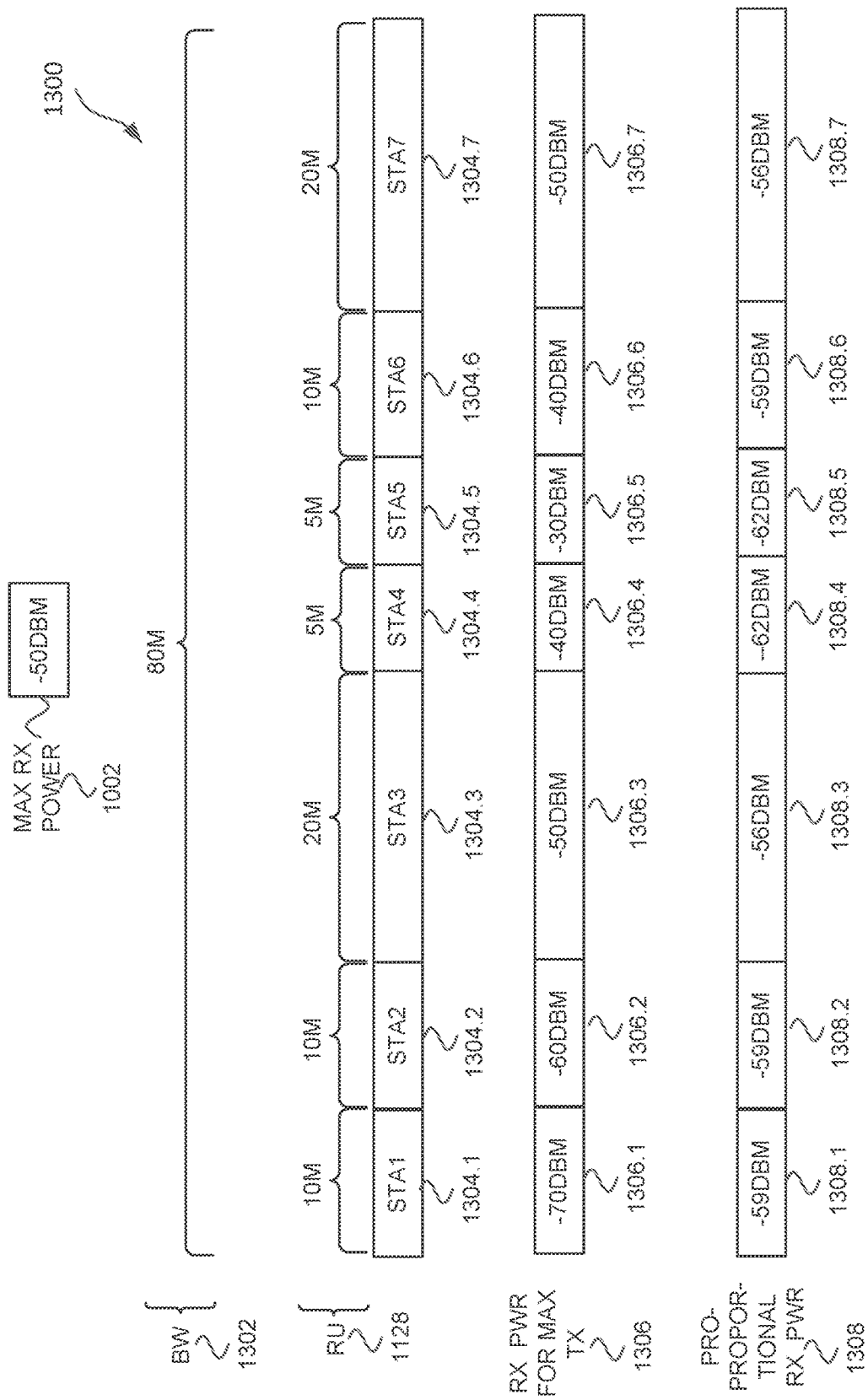
FIG. 13 illustrates an example of determining a maximum receive power for a RU based on a maximum receive power in accordance with some embodiments.

FIG. 13 illustrates an example of determining a maximum receive power 1002 for a RU 1128 based on a maximum receive power 1002 in accordance with some embodiments.

Illustrated in FIG. 13 is MAX RX power 1002, bandwidth (BW) 1302, RUs 1128, RX power (PWR) for maximum (max) TX 1306, and proportional RX PWR 1308. The BW 1302 for an uplink transmission is 80 MHz. The RUs 1128 are 10 MHz for STA1 1304.1, 10 MHz for STA2 1304.2, 20 MHz for STA3 1304.3, 5 MHz for STA4 1304.4, 5 MHz for STA5 1304.5, 10 MHz for STA6 1304.6, and 20 MHz for STA7 1304.7. The RX PWR for maximum TX 1306 indicates how much would be received at the master station 104 if the STA 1304 transmitted at its max TX. The proportional RX PWR 1308 indicates a proportion of the MAX RX power 1002 for the STA 1304 based on the proportion of the RU 1128 to the BW 1302, and, in some embodiments, a spatial stream allocation compared with a number of spatial streams.

The stations 1304 may be HE stations 104. The stations 104 may receive MAX RX power 1002 with an indication of a value of −50 dBm and must determine what power to transmit using their assigned RUs 1128. In some embodiments, the master station 102 may expect that one or more STAs 1304 will be negligible in their contribution to the MAX RX power 1002. For example, if the master station 102 determines that STA 1 1304.1 and STA2 1304.2 will be negligible in their contribution to the MAX RX power 1002, then the master station 102 may allow 1 dB higher power (1 dB is the equivalent of 1.25 and 0.25 is the portion occupied by STA1 1304.1 and STA2 1304.2). So, the master station 102 may increase the MAX RX power 1002 in proportion to the bandwidth that the master station 102 determines will contribute a negligible amount to MAX RX power 1002. In the example above, the MAX RX power 1002 may be communicated as −49 dBm rather than −50 dBm due to the negligible contribution expected from STA1 1304.1 and STA2 1304.2.

The stations 1304 may be configured to derive their proportional receive power 1308 based on the MAX RX power 1002 and on the RU 1128 size compared with the BW 1302. For example, STA1 1304.1, STA2 1304.2, and STA6 1304.6, (RU 1128/BW 1302) is equal to (10 MHz/80 MHz), which is equal to ⅛, which may be −50 dBm−9 dB=−59 dBm. For STA4 and STA5 (5 MHz/80 MHz), which is equal to ¹⁄₁₆th, which may be −50 dBm−12 dB=−62 dBm. For STA3 1304.3 and STA7 1304.7 (20 MHz/80 MHz), which is equal to ¼th, which may be −50 dBm−6 dB=−56 dBm for proportional TX PWR 1308.3 and 1308.7. In some embodiments, the proportional receive power 1308 is an RSSI limit for the received power at the master station 102. In some embodiments, the proportional receive power 1308 is not a target RSSI but an RSSI limit at the master station 102.

In some embodiments, the TXP STA1 1304.1 uses will not be limited because −70 dBm for TX PWR for MAX TX 1306.1 is lower than −59 dBm for proportional RX PWR 1308, but the TXP STA4 1304.4 uses will be limited by −62 dBm (proportional RX PWR 1308.4) instead of −40 dBM (RX PWR for MAX TX 1306.4), which it may be capable of. STA4 1304.4 will then have to reduce its power by 22 dB to meet the proportional RX PWR 1308 rather than using the RX PWR for MAX TX 1306. In some embodiments, MAX RX power 1002 could be indicated differently, e.g., power per MHz such as −69 dBM/MHz (80 MHz is 19 dB, so −50 dBM MAX RX power 1002 becomes −50 dBm−19 dB=−69 dBM/MHz) for FIG. 13, or power per other known bandwidth, e.g., minimum RU 1128 size. In some embodiments, MAX RX power 1002 may indicate a spectral power density.

In some embodiments, the HE stations 104 are configured to determine the proportional TX PWR 1308 in the following manner for both OFDMA and MU-MIMO operation. The proportional RX PWR 1308 is equal to (a)/(b), where (a) is the bandwidth of the HE station 104, e.g., the RU 1128; and, (b) is the sum of BW assigned to all HE stations 104 (e.g., BW 1302), where if an RU is allocated more than once (e.g., with MU-MIMO), then it is to be counted the number of times the RU is allocated.

For example: for RU#1 of 20 MHz, RU#2 of 20 MHz, and RU#3 of 40 MHz, with RU#1 allocated to two HE stations 104, RU#2 and RU#3 each allocated to only one HE station 104. Then the proportional TX PWR 1308 for RU#2 is 20/(20+20+20+40)=20/100=1/5 (so, two 20's for RU#1 since it is allocated twice, e.g., two spatial streams) In this way, the HE stations 104 may determine the proportional RX PWR 1308 for both OFDMA and MU-MIMO operation.

Figure 14:
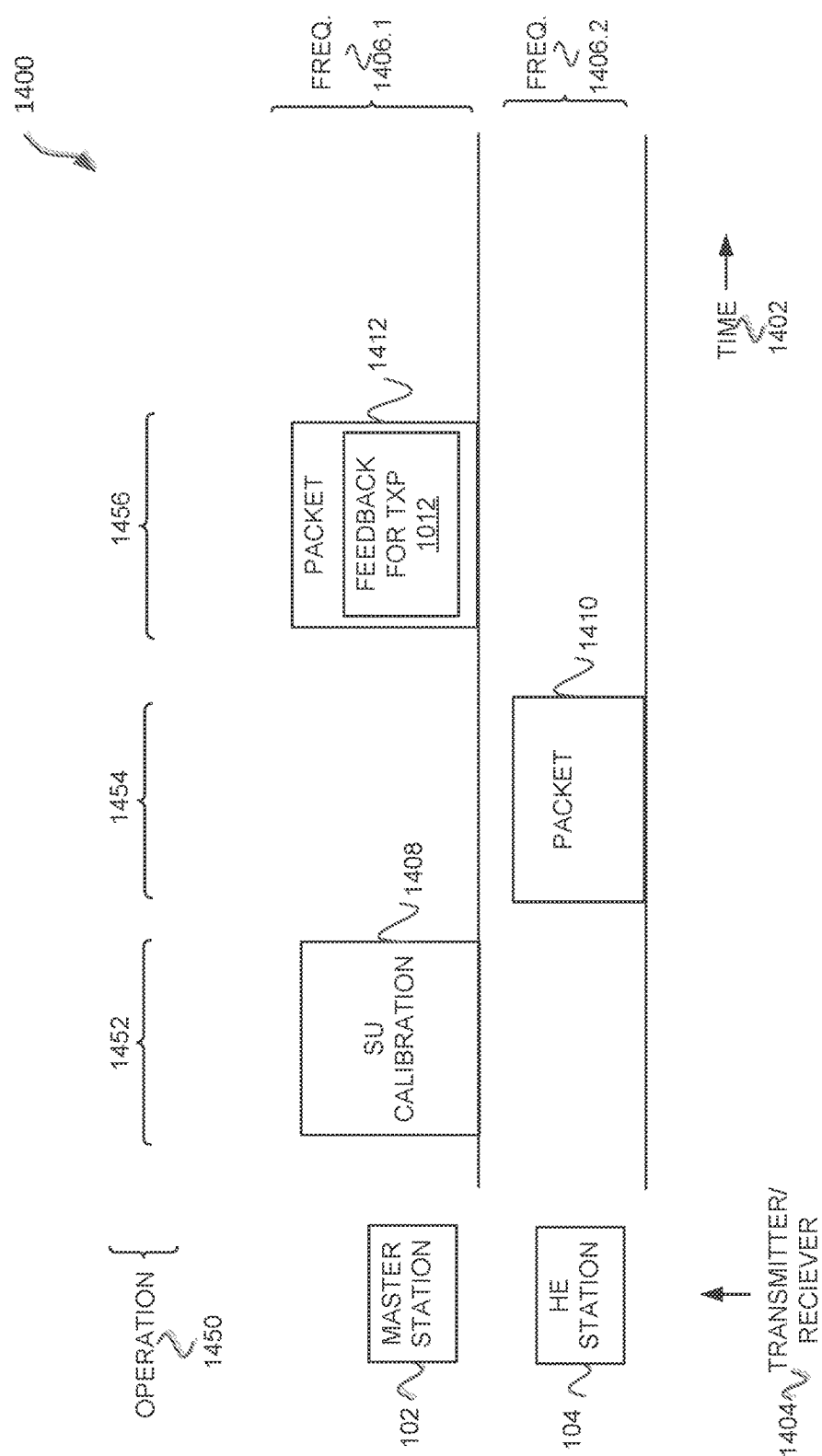
FIG. 14 illustrates a method of providing feedback to a HE station 104 in accordance with some embodiments.

FIG. 14 illustrates a method 1400 of providing feedback to a HE station 104 in accordance with some embodiments. Illustrated in FIG. 14 is time 1402 along a horizontal axis, transmitter/receiver 1404, frequency 1406 along a vertical axis, and operations 1450 along the top. The transmitter/receiver 1404 may be a master station 102 or a HE station 104. The frequency 1406 may be a channel, e.g. less than 20 MHz, 20 MHz, 40M Hz, 80 MHz, 160 MHz, 320 MHz, or another bandwidth. The frequencies 1406 may overlap. For example, two HE stations 104 may be allocated the same frequencies 1406 for MU-MIMO or a HE station 104 may use the same frequency 1406.1 for a packet 1410 as the master station 102 uses for single user (SU) calibration 1408.

The method 1400 begins at operation 1452 with the master station 102 transmitting SU calibration 1408. SU calibration 1408 may be a HE PPDU. The SU calibration 1408 may indicate it is a calibration frame with a field such as calibration 1110. SU calibration 1408 may include an address of the HE station 104 indicating the SU calibration is for the HE station 104. SU calibration 1408 may include MAX RX power 1002. SU calibration 1408 may include MS TXP 1004.

The method 1400 continues at operation 1454 with the HE stations 104 transmitting packet 1410 to the master station 102. Packet 1410 may be a HE PPDU. The HE station 104 may transmit the packet 1410 with TXP used 1202. Packet 1414 may be packet from HE station 1010 as described herein. In some embodiments, packet 1410 may include TXP offset 1204 as described herein. In some embodiments, HE station 104 may use MS TXP 1004 to determine TXP used 1202, as well as one or more of RU 1128, MAX RX power 1002, and MCS 1130.

The master station 102 may receive packet 1410 and determine a feedback for TXP 1012 as described herein. For example, the master station 102 may determine feedback for TXP 1012 based on a RSSI. The master station may use the TXP offset 1204 to adjust MAX RX power 1002.

The method 1400 may continue at operation 1456 with the master station 102 transmitting packet 1412 comprising feedback for TXP 1012 to the HE station 104. The packet 1412 may be a HE PPDU The HE station 104 may use the feedback for TXP 1012 to calibrate the TXP used 1202 to transmit packet 1410. In some embodiments, the HE station 104 may solicit the feedback for TXP 1012 with a HE PPDU to the master station 102 that responds with a packet with the feedback for TXP 1012.

Calibrating the TXP used 1202 by receiving feedback for TXP 1012 may improve the accuracy of the TXP used 1202. In some embodiments, receiving feedback for TXP 1012 provides a better estimate for TXP used 1202 than estimating path loss to the master station 102 based on path loss from the master station 102 to the HE station 104 using the MS TXP 1004.

Moreover, calibration may be important for minimizing the difference in the received signals from multiple HE stations 104, which may make it difficult for the master station 102 to properly set a AGC 1006 to receive the signals from all the HE stations 104. For example, one HE station 104 may be +2 dB and another HE station 104 may be −2 dB, which may lead to difficulty to setting the AGC 1006 to decode both signals accurately. In some embodiments, the HE station 104 may after calibration be able to meet the MAX RX power 1002 within 1 dB.

Figure 15:
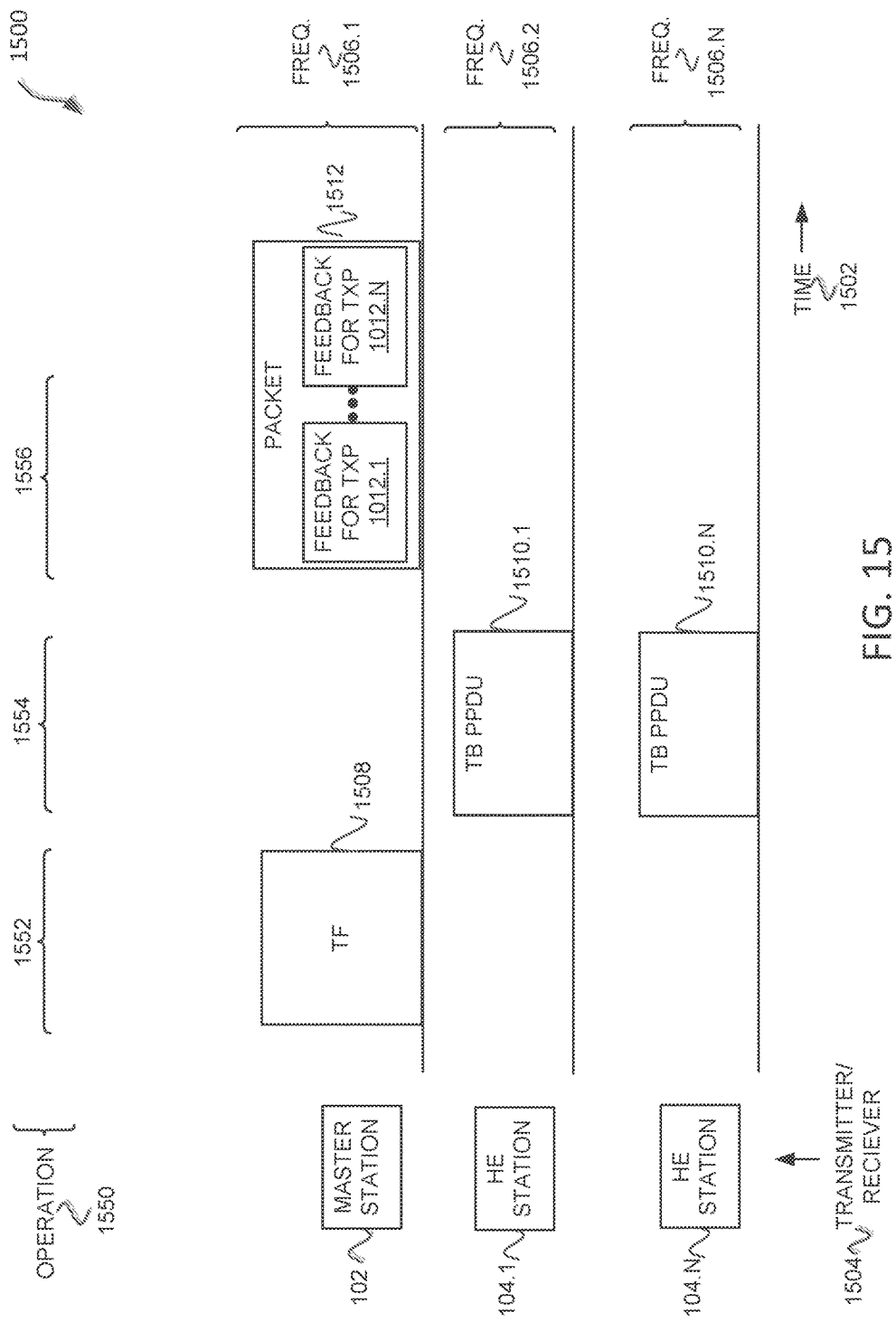
FIG. 15 illustrates a method of providing feedback to a HE station in accordance with some embodiments.

FIG. 15 illustrates a method 1500 of providing feedback to a HE station 104 in accordance with some embodiments Illustrated in FIG. 15 is time 1502 along a horizontal axis, transmitter/receiver 1504, frequency 1 506 along a vertical axis, and operations 1550 along the top. The transmitter/receiver 1504 may be a master station 102 or a HE station 104. The frequency 1506 may be a channel, e.g. less than 20 MHz, 20 MHz. 40 MHz, 80 MHz. 160 MHz, 320 MHz, or another bandwidth. The frequencies 1506 may overlap. For example, two HE stations 104 may be allocated the same frequencies 1506 for MU-MIMO or a HE station 104 may use the same frequency 1506.1 for a packet 1510 as the master station 102 uses for TF 1508.

The method 1500 begins at operation 1552 with the master station 102 transmitting TF 1508. TF 1508 may be a trigger frame 1100. TF 1508 may be a trigger for calibration, e.g., TF 1100 with calibration 1110 set.

The TF 1508 may include addresses of the HE stations 104 indicating the TF 1508 is for the HE stations 104. The TF 1508 may include MAX RX power 1002. The TF 1508 may include MS TXP 1004.

The TF 1508 includes resource allocation for the HE stations 104 to transmit the TB PPDUs 1510. For example, TF 1100 includes common information 1118 and per user information 1124 for an UL resource allocation.

The method 1500 continues at operation 1454 with the HE stations 104 transmitting TB PPDUs 1510 to the master station 102 in accordance with the TF 1508. The HE stations 104 are allocation an RU 1128, which may be less than the BW 1302 (e.g., FIG. 13). The HE stations 104 may transmit the TB PPDUs 1510 with TXP used 1202. The HE stations 104 may determine TXP used 1202 based on the MAX RX power 1202, the RU 1128 (e.g., see FIG. 13), and, in some embodiments, MS TXP 1004 and/or MCS 1130.

The master station 102 may receive TB PPDUs 1510 and determine a feedback for TXP 1012 as described herein for each of the HE stations 104. For example, the master station 102 may determine feedback for TXP 1012 based on a RSSI. In some embodiments, the master station may use the TXP offset 1204 to adjust MAX RX power 1002. In some embodiments, the master station 102 may use the received power of the TB PPDUs 1510 to adjust MAX RX power 1002.

The method 1500 may continue at operation 1556 with the master station 102 transmitting packet 1512 comprising feedback for TXP 1012.1 through feedback for TXP 1012.N to the HE stations 104.1 through HE stations 104.N, respectively. The packet 1512 may be a HE PPDU. The packet 1512 may be a next TF with UL resource allocations that are the same as TF 1508.

The HE station 104.1 through HE station.n may use the feedback for TXP 1012.1 through feedback for TXP 1012.N to calibrate the TXP used 1202.1 through TXP used 1202.N, respectively. In some embodiments, the packet 1512 is a next TF and the HE stations 104 transmit next TB PPDU 1510 using the same RUs 1128 with the calibrated TXP used 1202.1 through TXP used 1202.N.

In some embodiments, calibrating the TXP used 1202 for a RU 1128 improves the calibration for the HE station 104 for that RU 1128.

Calibrating the TXP used 1202 by receiving feedback for TXP 1012 may improve the accuracy of the TXP used 1202. In some embodiments, receiving feedback for TXP 1012 provides a better estimate for TXP used 1202 than estimating path loss to the master station 102 based on path loss from the master station 102 to the HE station 104 using the MS TXP 1004.

In some embodiments, the master station 102 may identify consistent offsets (e.g., MCS7 is transmitted within MAX RX power 1002, but is 2 dB stronger than needed for MCS7.) In some embodiments, the master station 102 may transmit to one or more HE stations 104 power-reduction-per-MCS tables or entries. The power-reduction-per-MCS tables indicate to a HE station 104 a power reduction the HE station 104 may try with the current MCS. The power-reduction-per MCS tables or entries may be transmitted from the master station 102 to one or more HE stations 104, e.g., in an IE, a RAE, in a RAIE, or in a field or fields of a packet such as a TF 1100.

Figure 16:
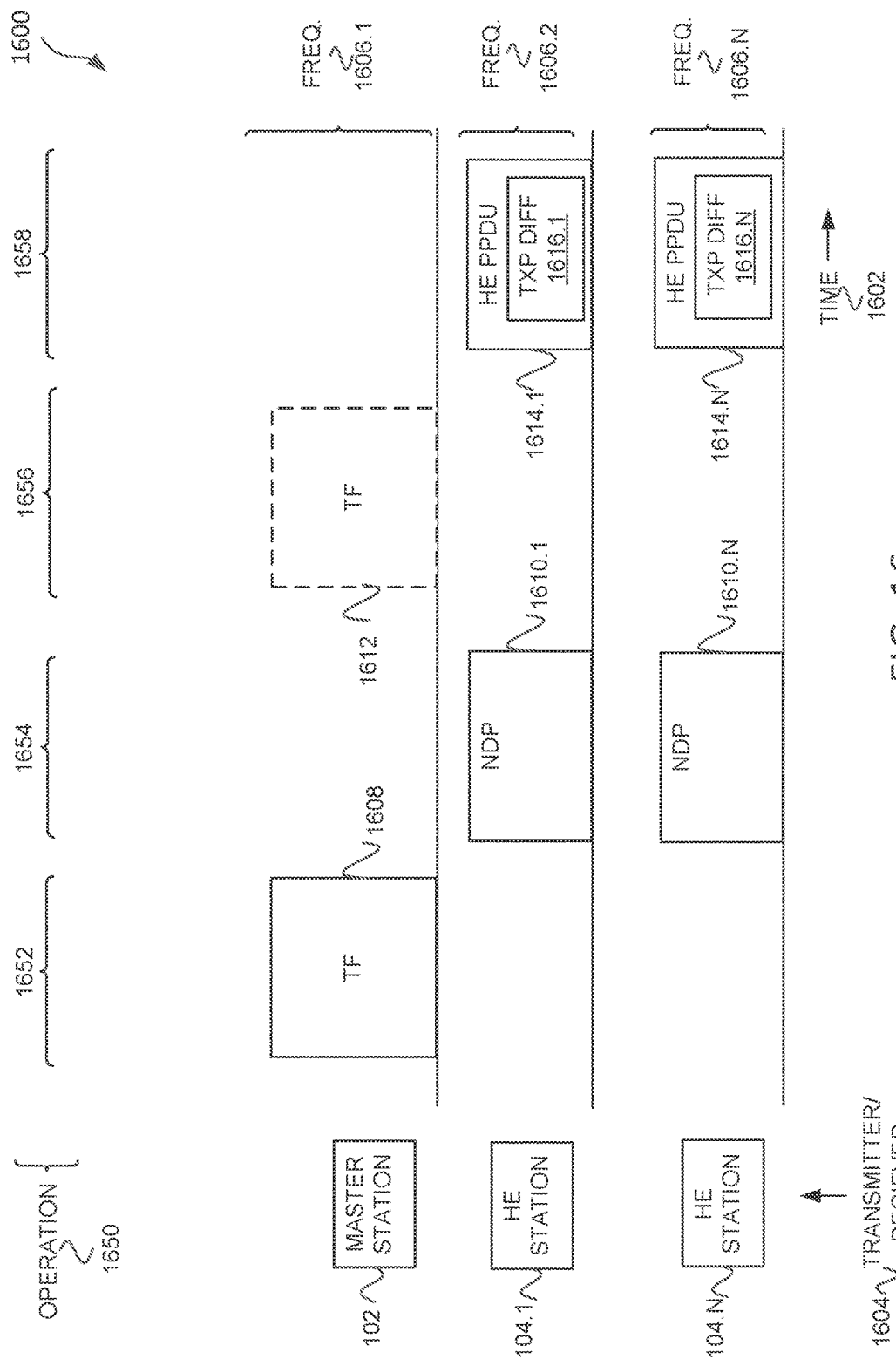
FIG. 16 illustrates a method of TXP control for UL transmissions in accordance with some embodiments.

FIG. 16 illustrates a method 1600 of TXP control for UL transmissions in accordance with some embodiments. Illustrated in FIG. 16 is time 1602 along a horizontal axis, transmitter/receiver 1604, frequency 1606 along a vertical axis, and operations 1650 along the top. The transmitter/receiver 1604 may be a master station 102 or a HE station 104. The frequency 1606 may be a channel, e.g. less than 20 MHz, 20 MHz, 40 MHz, 80 MHz, 160 MHz, 320 MHz, or another bandwidth. The frequencies 1606 may overlap. For example, two HE stations 104 may be allocated the same frequencies 1606 for MU-MIMO or a HE station 104 may use the same frequency 1606.1 for a NDP 1610 as the master station 102 uses for TF 1608.

The method 1600 begins at operation 1652 with the master station 102 transmitting TF 1608. TF 1608 may be a trigger frame 1100. TF 1608 may be a trigger for calibration, e.g., TF 1100 with calibration 1110 set. In some embodiments, TF 1608 may be a trigger frame for sounding. The TF 1608 may indicate that the HE stations 104 are to transmit NDPs in accordance with resource allocations in the TF 1608.

The TF 1608 may include addresses of the HE stations 104. The TF 1608 may include MAX RX power 1002. The TF 1608 may include MS TXP 1004.

The TF 1608 includes resource allocation for the HE stations 104 to transmit the NDPs 1610. For example, TF 1100 includes common information 1118 and per user information 1124 for an UL resource allocation. In some embodiments, the TF 1608 indicates the HE stations 104 are to transmit a NDP 1610 and then a HE PPDU 1614 as described herein.

The method 1600 continues at operation 1654 with the HE stations 104 transmitting NDPs 1610 to the master station 102 in accordance with the TF 1608. The HE stations 104 are allocated an RU 1128, which may be less than the BW 1302 (e.g., FIG. 13). The HE stations 104 may transmit the NDPs 1610 with TXP used 1202. The HE stations 104 may determine TXP used 1202 based on the MAX RX power 1202, the RU 1128 (e.g., see FIG. 13), and, in some embodiments, MS TXP 1004. The HE stations 104 retain the TXP used 1202, which may be less than a maximum TXP used 1202 for a better EVM observed at the master station 102.

The method 1600, optionally, continues at operation 1656 with the master station 102 transmitting a second TF 1612 with uplink resource allocations for HE PPDUs 1614. The master station 102 may receive NDPs 1610 and determine a feedback for TXP 1012 as described herein for each of the HE stations 104. For example, the master station 102 may determine feedback for TXP 1012 based on a RSSI. In some embodiments, the master station may use the TXP offset 1204 to adjust MAX RX power 1002. In some embodiments, the master station 102 may use the received power of the TB PPDUs 1510 to adjust MAX RX power 1002.

The method 1600 continues at operation 1658 with the HE stations transmitting HE PPDUs 1614. The HE stations 104 include in the HE PPDUs 1614 TXP difference 1616, which may be one or both of a maximum transmit power and a lower transmit power. The maximum transmit power may be difference from TXP used 1202. For example, if TXP used 1202 is 10 dBm, then TXP difference 1616 may be 9 dB, if the HE station 104 can transmit up to 19 dBm. The minimum transmit power may be a difference from TXP used 1202. For example, if TXP used 1202 is 10 dBm, then TXP difference 1616 may be 20 dBm, if the HE station 104 can transmit at −10 dBm. In some embodiments, the TXP difference 1616 may be termed a headroom indicating how many dBs above the TXP used 1202 the HE station 104 could use to transmit. The HE station 104 may determine the TXP difference 1616 based on co-existent wireless protocols, regulatory standards, etc.

The master station 102 may then use the TXP difference 1616 and add it to the feedback for TXP 1012, which may be adjusted according to the RU 1128 and BW 1302 (see FIG. 13). The master station 102 may use the TXP difference 1616 to adjust the MAX RX power 1002. The HE stations 104 transmit the HE PPDU 1614 with TXP used 1202. The master station 102 may use the TXP difference 1616 to identify a RX PWR for MAX TX 1306 (see FIG. 13).

Figure 17:
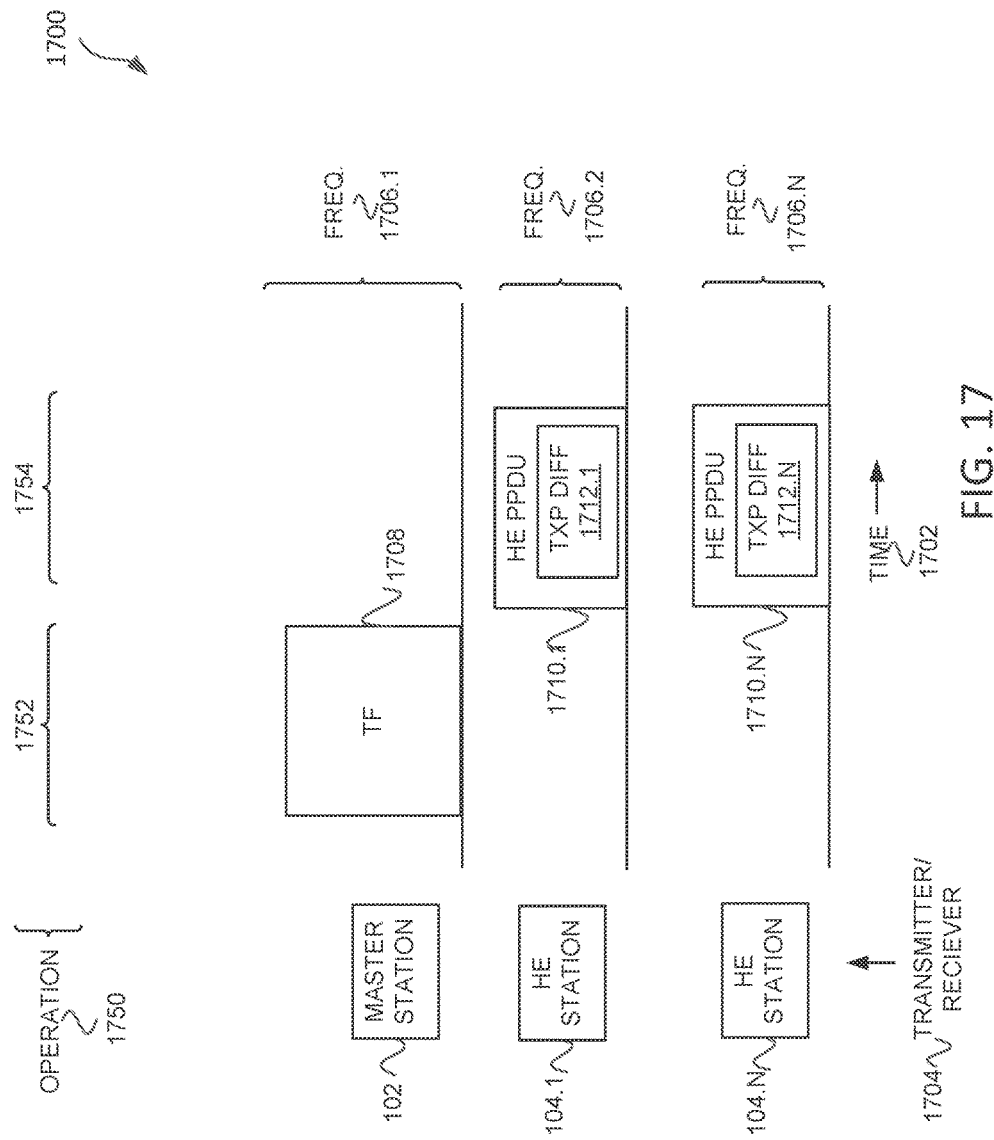
FIG. 17 illustrates a method for TXP control for UL transmissions in accordance with some embodiments.

FIG. 17 illustrates a method 1700 for TXP control for UL transmissions in accordance with some embodiments. Illustrated in FIG. 17 is time 1702 along a horizontal axis, transmitter/receiver 1704, frequency 1706 along a vertical axis, and operations 1750 along the top. The transmitter/receiver 1704 may be a master station 102 or a HE station 104. The frequency 1706 may be a channel, e.g. less than 20 MHz, 20 MHz, 40 MHz, 80 MHz, 160 MHz, 320 MHz, or another bandwidth. The frequencies 1706 may overlap. For example, two HE stations 104 may be allocated the same frequencies 1706 for MU-MIMO or a HE station 104 may use the same frequency 1706.1 for a HE PPDU 1710 as the master station 102 uses for TF 1708.

The method 1700 begins at operation 1752 with the master station 102 transmitting TF 1708. TF 1708 may be a trigger frame 1100. TF 1708 may be a trigger for calibration, e.g., TF 1100 with calibration 1110 set. The TF 1708 may indicate that the HE stations 104 are to transmit TXP difference 1712 in accordance with resource allocations in the TF 1708.

The TF 1708 may include addresses of the HE stations 104. The TF 1708 may include MAX RX power 1002. The TF 1708 may include MS TXP 1004.

The TF 1708 includes resource allocation for the HE stations 104 to transmit the HE PPDUs 1710. For example, TF 1100 includes common information 1118 and per user information 1124 for an UL resource allocation.

The method 1700 continues at operation 1754 with the HE stations 104 transmitting HE PPDUs 1710 to the master station 102 in accordance with the TF 1708. The HE stations 104 are allocated an RU 1128, which may be less than the BW 1302 (e.g., FIG. 13). The HE stations 104 may transmit the HE PPDUs 1710 with TXP used 1202. The HE stations 104 may determine TXP used 1202 based on the MAX RX power 1202, the RU 1128 (e.g., see FIG. 13), and, in some embodiments. MS TXP 1004 and/or MCS 1130. The HE stations 104 retain the TXP used 1202, which may be less than a maximum TXP used 1202 for a higher EVM at the master station 102.

The method 1700 continues at operation 1754 with the HE stations 104 transmitting HE PPDUs 1614. The HE stations 104 transmit the HE PPDU 1614 with TXP used 1202. The HE stations 104 include in the HE PPDUs 1714 TXP difference 1712, which may be one or both of a maximum transmit power and a lower transmit power. The maximum transmit power may be difference from TXP used 1202. For example, if TXP used 1202 is 10 dBm, then TXP difference 1716 may be 9 dB, if the HE station 104 can transmit up to 19 dBm. The minimum transmit power may be a difference from TXP used 1202. For example, if TXP used 1202 is 10 dBm, then TXP difference 1716 may be 20 dBm, if the HE station 104 can transmit at −10 dBm.

The master station 102 may then use the TXP difference 1716 and add it to the feedback for TXP 1012, which may be adjusted according to the RU 1128 and BW 1302 (see FIG. 13). The master station 102 may use the TXP difference 1616 to adjust the MAX RX power 1002. The TXP difference 1716 may be based on the RU 1128 and/or the MCS 1130. The TXP difference 1716 may in dBs.

Figure 18:
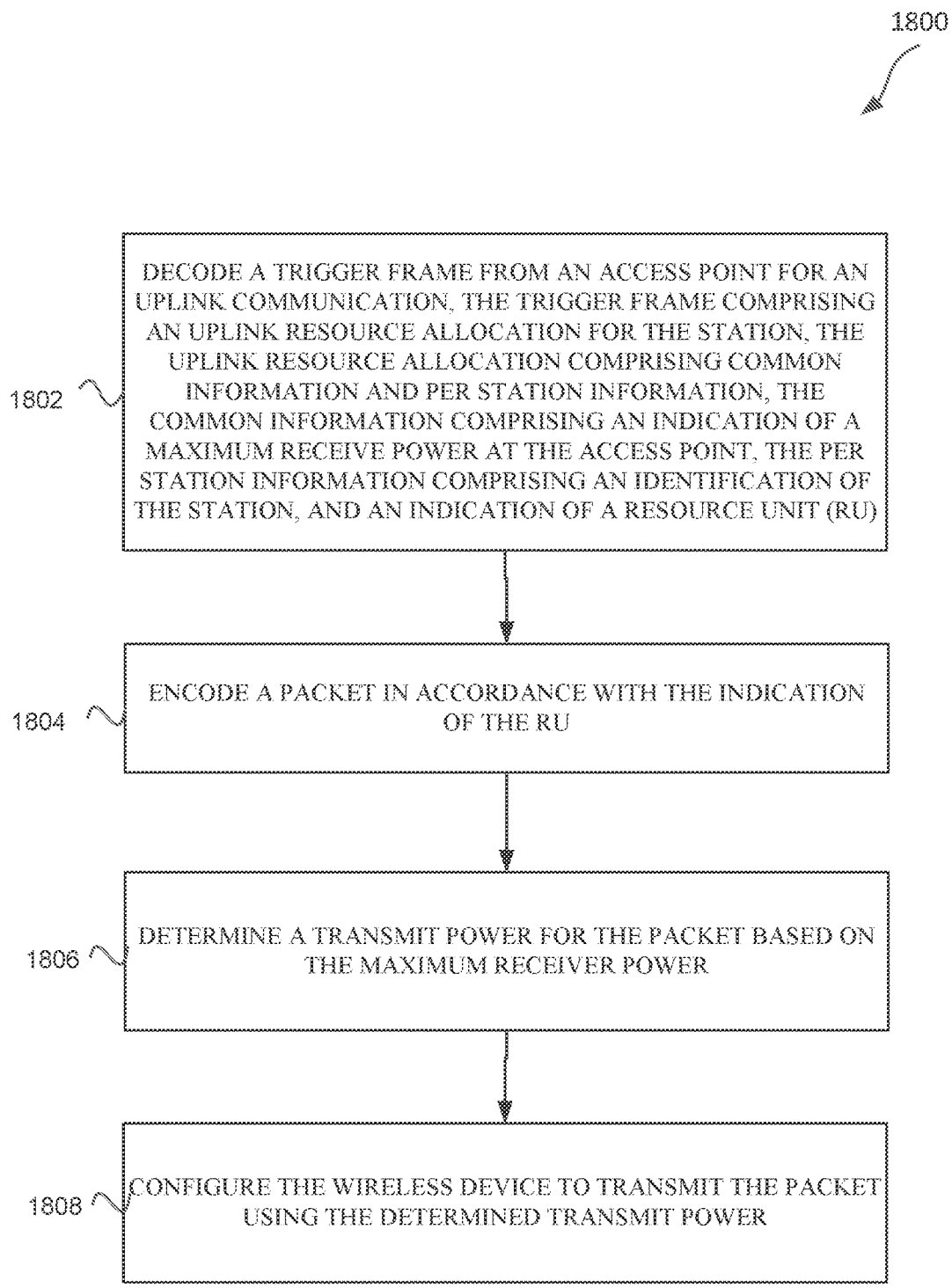
FIG. 18 illustrates a method for TXP control for UL transmissions in accordance with some embodiments.

FIG. 18 illustrates a method 1800 for TXP control for UL transmissions in accordance with some embodiments. The method 1800 begins at operation 1800 with decode a trigger frame from an access point for an uplink communication, the trigger frame comprising an uplink resource allocation for the station, the uplink resource allocation comprising common information and per station information, the common information comprising an indication of a maximum receive power at the access point, the per station information comprising an identification of the station, and an indication of a RU.

For example, HE stations 104 of FIG. 17 may decode TF 1708, HE stations 104 of FIG. 16 may decode TF 1608 or TF 1612, or HE stations 104 of FIG. 15 may decode TF 1508 or packet 1512. And, in some embodiments, HE station of FIG. 14 may decode SU calibration 1408, which may be termed a single user trigger frame in some embodiments.

The method 1800 continues at operation 1804 with encoding a packet in accordance with the indication of the RU. For example, HE station 104 of FIG. 14 may encode packet 1410, HE stations 104 may encode TB PPDU 1510, HE stations 104 of FIG. 16 may encode NDPs 1610 or HE PPDUs 1614, or HE stations 104 of FIG. 17 may encode HE PPDUs 1710.

The method 1800 continues at operation 1806 with determining a transmit power for the packet based on the maximum receiver power. For example, the HE stations 104 may determine a transmit power as disclosed in accordance with FIGS. 10-17.

The method 1800 continues at operation 1808 with configuring the wireless device to transmit the packet using the determined transmit power. For example, an apparatus of an HE station 104 may configure the HE station 104 to transmit packet 1410, TB PPDU 1510, NDPs 1610, HE PPDU 1614, or HE PPDU 1710, in accordance with the determined transmit power.

Figure 19:
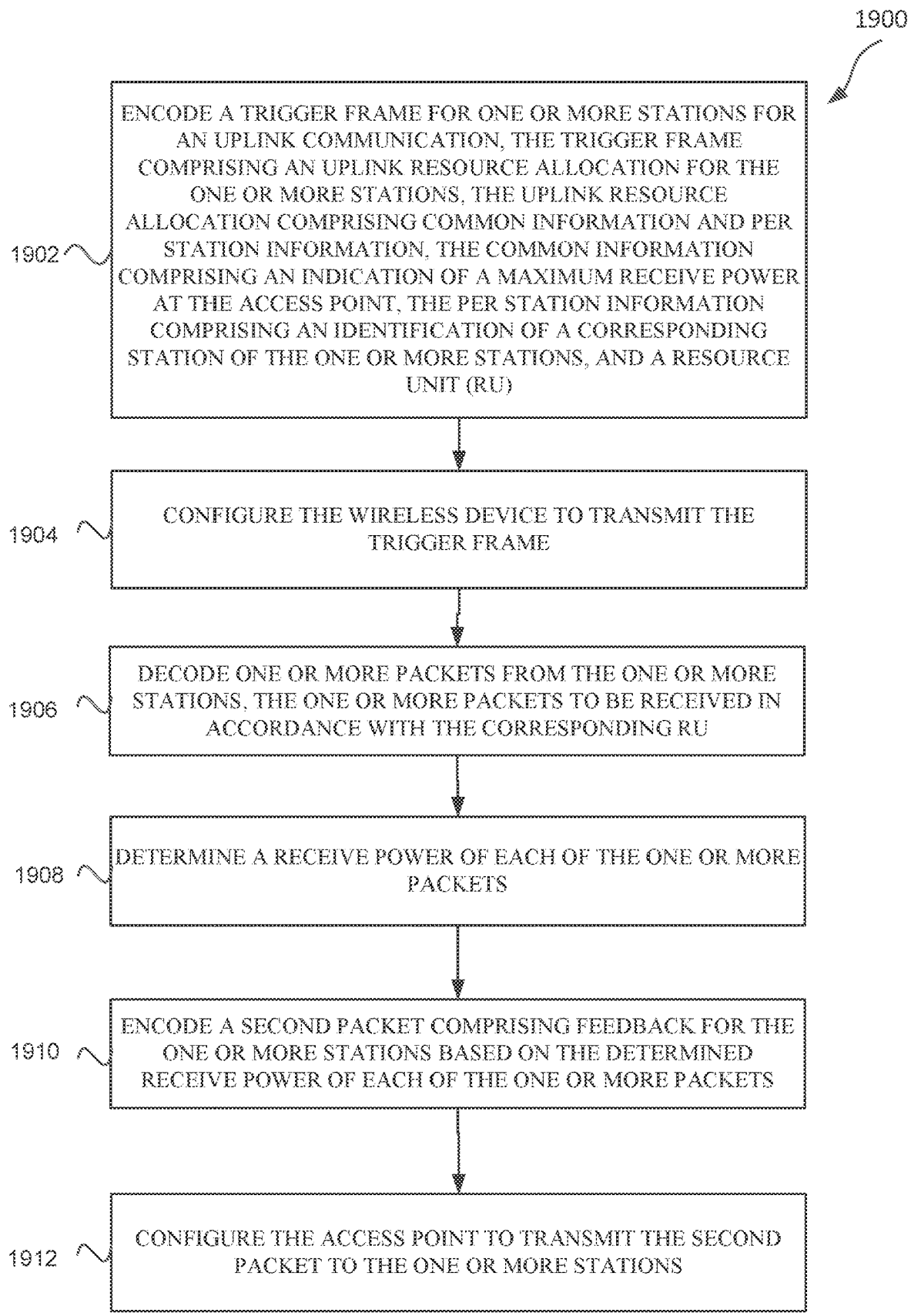
FIG. 19 illustrates a method for TXP control for UL transmissions in accordance with some embodiments.

FIG. 19 illustrates a method 1900 for TXP control for UL transmissions in accordance with some embodiments. The method 1900 begins at operation 1902 with encoding a trigger frame for one or more stations for an uplink communication, the trigger frame comprising an uplink resource allocation for the one or more stations, the uplink resource allocation comprising common information and per station information, the common information comprising an indication of a maximum receive power at the access point, the per station information comprising an identification of a corresponding station of the one or more stations, and a RU.

For example, master station 102 (or apparatus of the master station 102) of FIG. 14 may encode SU calibration 1408, master station 102 of FIG. 15 may encode TF 1508 or packet 1512, master station 102 may encode TF 1608 or TF 1612, or master station 102 may encode TF 1708.

The method 1900 continues at operation 1904 with configuring the access point to transmit the trigger frame. For example, an apparatus of a master station 102 (or apparatus of the master station 102) may configure the master station 102 to transmit SU calibration 1408, TF 1508, TF 1512, TF 1608, TF 1612, or TF 1708.

The method 1900 continues at operation 1906 with decode one or more packets from the one or more stations, the one or more packets to be received in accordance with the corresponding RU.

For example, master station 102 of FIG. 14 may decode packet 1410, master station (or apparatus of the master station 102) 102 of FIG. 15 may decode TB PPDU 1510, master station (or apparatus of the master station 102) 102 of FIG. 16 may decode NDPs 1610 or HE PPDUs 1614, or master station (or apparatus of the master station 102)102 of FIG. 17 may decode TF 1708.

The method 1900 continues at operation 1908 with determining a receive power of each of the one or more packets. For example, master station 102 (or apparatus of the master station 102) may determine a receive power of packet 1410, TB PPDUs 1510, NDPs 1610, or HE PPDUs 1710.

The method 1900 continues at operation 1910 with encoding a second packet comprising feedback for the one or more stations based on the determined receive power of each of the one or more packets. For example, a master station 102 (or apparatus of the master station 102) may encode packet 1412 with feedback for TXP 1012, packet 1512 with feedback for TXP 1012, or TF 1612 (which may include feedback for TXP 1012).

The method 1900 continues at operation 1912 with configuring the access point to transmit the second packet to the one or more stations. For example, an apparatus of the master station 102 may configure the master station to transmit packet 1412 with feedback for TXP 1012, packet 1512 with feedback for TXP 1012, or TF 1612 (which may include feedback for TXP 1012).

Figure 20:
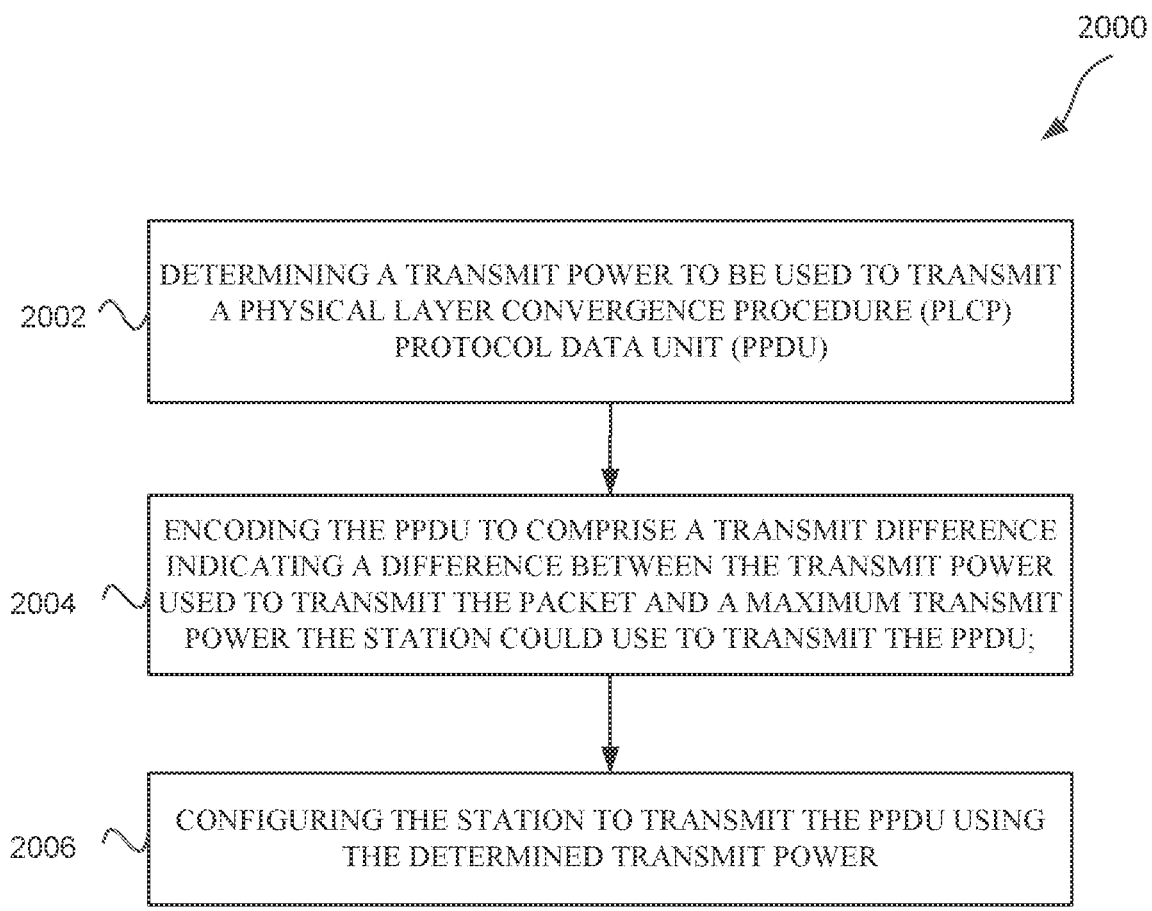
FIG. 20 illustrates a method for TXP control for transmissions in accordance with some embodiments.

FIG. 20 illustrates a method 2000 for TXP control for transmissions in accordance with some embodiments. The method 2000 begins at operation 2002 with determining a transmit power to be used to transmit a PPDU. For example, HE station 104 of FIG. 12 may determine TXP used 1202. The method 2000 continues at operation 2002 with encoding the PPDU to comprise a transmit difference indicating a difference between the transmit power used to transmit the packet and a maximum transmit power the station could use to transmit the PPDU. For example, HE station 104 of FIG. 12 may encode a packet including TXP offset 1204. The method 2000 continues at operation 2006 with configuring the station to transmit the PPDU using the determined transmit power. For example, an apparatus of HE station 104 of FIG. 12 may configure the HE station 104 to transmit packet from HE station 1010 or another packet.

Optionally, the method 2000 includes determining the transmit power to be used to transmit the PPDU based on one or more of the following group: a maximum receive power at a receiver of the packet, a path loss from the station to the receiver of the packet, a maximum transmit power of the station, coexistence of another communication protocol with the station, a proximity detection, thermal conditions, static regulatory requirements, or a SAR. For example, HE station 104 of FIG. 12 may determine TXP used 1202 based on one or more of the following: a MAX RX power 1002, a path loss from the HE station 104 to the master station 102 (e.g. it may be estimated based on the master station 102 including a transmit power of a packet to he HE station 104), a maximum transmit power of the HE station 104, coexistence of another communication protocol with the HE station 104, a proximity detection, thermal conditions, static regulatory requirements, or a specific absorption rate (SAR).

Figure 21:
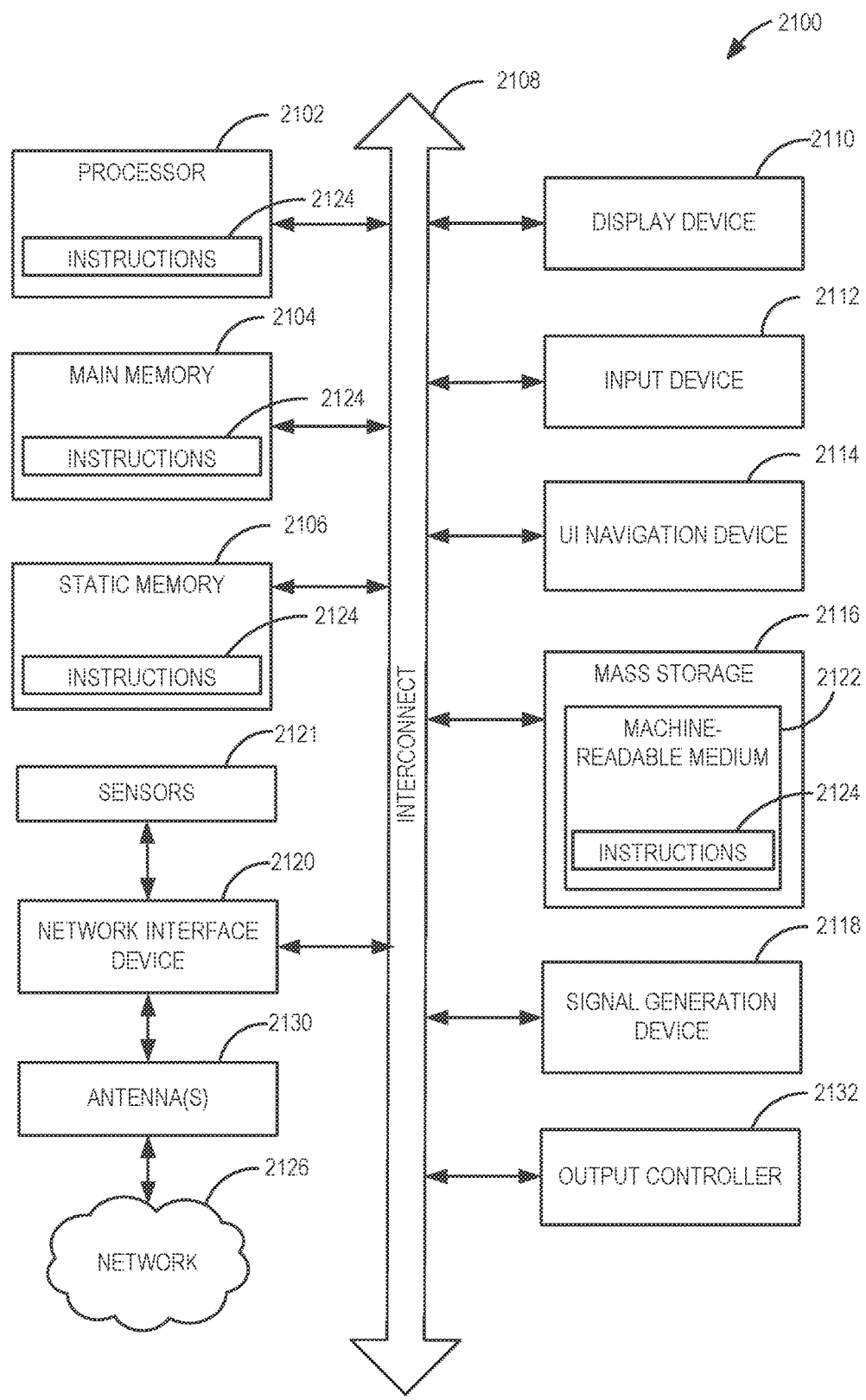
FIG. 21 illustrates a block diagram of an example machine upon which any one or more of the techniques (e.g., methodologies) discussed herein may perform.

FIG. 21 illustrates a block diagram of an example machine 2100 upon which any one or more of the techniques (e.g., methodologies) discussed herein may perform. In alternative embodiments, the machine 2100 may operate as a standalone device or may be connected (e.g., networked) to other machines. In a networked deployment, the machine 2100 may operate in the capacity of a server machine, a client machine, or both in server-client network environments. In an example, the machine 2100 may act as a peer machine in peer-to-peer (P2P) (or other distributed) network environment. The machine 2100 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2100 may include a hardware processor 2102 (e.g., a central processing unit (CPU), a graphics processing unit (GPU), a hardware processor core, or any combination thereof), a main memory 2104 and a static memory 2106, some or all of which may communicate with each other via an interlink (e.g., bus) 2108. The machine 2100 may further include a display unit 2110, an alphanumeric input device 2112 (e.g., a keyboard), and a user interface (UI) navigation device 2114 (e.g., a mouse). In an example, the display unit 2110, input device 2112 and UI navigation device 2114 may be a touch screen display.

The machine 2100 may additionally include a storage device (e.g., drive unit) 2116, a signal generation device 2118 (e.g., a speaker), a network interface device 2120, and one or more sensors 2121, such as a global positioning system (GPS) sensor, compass, accelerometer, or other sensor. The machine 2100 may include an output controller 2128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 2102 and/or instructions 2124 may comprise processing circuitry.

The storage device 2116 may include a machine readable medium 2122 on which is stored one or more sets of data structures or instructions 2124 (e.g., software) embodying or utilized by any one or more of the techniques or functions described herein. The instructions 2124 may also reside, completely or at least partially, within the main memory 2104, within static memory 2106, or within the hardware processor 2102 during execution thereof by the machine 2100. In an example, one or any combination of the hardware processor 2102, the main memory 2104, the static memory 2106, or the storage device 2116 may constitute machine readable media.

While the machine readable medium 2122 is illustrated as a single medium, the term "machine readable medium" may include a single medium or multiple media (e.g., a centralized or distributed database, and/or associated caches and servers) configured to store the one or more instructions 2124.

The term "machine readable medium" may include any medium that is capable of storing, encoding, or carrying instructions for execution by the machine 2100 and that cause the machine 2100 to perform any one or more of the techniques of the present disclosure, or that is capable of storing, encoding or carrying data structures used by or associated with such instructions Non-limiting machine readable medium examples may include solid-state memories, and optical and magnetic media.

Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 2124 may further be transmitted or received over a communications network 2126 using a transmission medium via the network interface device 2120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2120 may include one or more physical jacks (e.g., Ethernet, coaxial, or phone jacks) or one or more antennas to connect to the communications network 2126.

In an example, the network interface device 2120 may include a plurality of antennas to wirelessly communicate using at least one of single-input multiple-output (SIMO), multiple-input multiple-output (MIMO), or multiple-input single-output (MISO) techniques. In some examples, the network interface device 2120 may wirelessly communicate using Multiple User MIMO techniques. The term "transmission medium" shall be taken to include any intangible medium that is capable of storing, encoding or carrying instructions for execution by the machine 2100, and includes digital or analog communications signals or other intangible medium to facilitate communication of such software.

The following examples pertain to further embodiments. Example 1 is an apparatus of a station including: a memory; and processing circuitry couple to the memory, where the processing circuitry is configured to: decode a trigger frame from an access point for an uplink communication, the trigger frame including an uplink resource allocation for the station, the uplink resource allocation including common information and per station information, the common information including an indication of a maximum receive power at the access point, the per station information including an identification of the station, and an indication of a resource unit (RU), encode an uplink (UL) physical layer convergence procedure (PLCP) protocol data unit (PPDU)(UL-PPDU) in accordance with the indication of the RU; determine a transmit power for the UL-PPDU based on the maximum receive power; and configure the wireless device to transmit the UL-PPDU using the determined transmit power.

In Example 2, the subject matter of Example 1 optionally includes where the processing circuitry is further configured to: determine a proportional maximum receive power based on one or both of: a first bandwidth of the RU divided by a second bandwidth of the uplink communication; and, a number of stations allocated RUs, and determine the transmit power for the packet based on the proportional maximum receive power.

In Example 3, the subject matter of any one or more of Examples 1-2 optionally include where the per wireless device information further comprises an indication of a modulation and coding scheme (MCS), and where the UL-PPDU is a trigger based (TB) (UL-PPDU)(UL-TB-PPDU), and where the processing circuitry is further configured to: encode the packet in accordance with the indication of the MCS.

In Example 4, the subject matter of Example 3 optionally includes where the processing circuitry is further configured to: determine the transmit power for the UL-TB-PPDU further based on the indication of the MCS and a signal-to-noise ratio for the MCS.

In Example 5, the subject matter of any one or more of Examples 3-4 optionally include where the processing circuitry is further configured to: decode a second packet from the access point for a second uplink communication, the second packet including a second uplink resource allocation for the station, the second uplink resource allocation including second common information and second per station information, the second common information including a second indication of a maximum receive power at the access point, the second per station information including an indication of a received power of the UI-TB-PPDU at the access point, a second indication of a MCS, the identification of the station, and a second RU; encode a second UL-TB-PPDU in accordance with the indication of the second MCS and the second RU; determine a second transmit power for the second UL-TB-PPDU based on the second indication of the maximum receive power and the indication of the received power of the UL-TB-PPDU at the access point; and configure the wireless device to transmit the second UL-TB-PPDU using the determined second transmit power.

In Example 6, the subject matter of any one or more of Examples 1-5 optionally include where the processing circuitry is further configured to: encode the UL-PPDU to comprise a transmit difference indicating a difference between the transmit power used to transmit the packet and a maximum transmit power the first wireless device could use to transmit the packet.

In Example 7, the subject matter of any one or more of Examples 1-6 optionally include where the processing circuitry is further configured to: decode a frame from the access point including an indication of a received power of the UL-PPDU.

In Example 8, the subject matter of Example 7 optionally includes where the processing circuitry is further configured to: store the indication of the received power of the UL-PPDU; and use the indication of the received power of the UL-PPDU to determine a second transmit power for a second UL-PPDU to be transmitted to the access point.

In Example 9, the subject matter of any one or more of Examples 1-8 optionally include where the common information further comprises an indication of a transmit power used to transmit the trigger frame.

In Example 10, the subject matter of Example 9 optionally includes where the processing circuitry is further configured to: determine a path loss based on the an indication of the transmit power used to transmit the trigger frame and a received power of the trigger frame at the station; and determine the transmit power for the packet further based on the path loss.

In Example 11, the subject matter of any one or more of Examples 1-10 optionally include where the processing circuitry is further configured to: determine the transmit power for the UL-PPDU based on a proportion of the RU to a total bandwidth, the total bandwidth indicated in the trigger frame or based determined based on a communication standard.

In Example 12, the subject matter of any one or more of Examples 1-11 optionally include where the UL-PPDU is a null data packet.

In Example 13, the subject matter of any one or more of Examples 11-12 optionally include where the processing circuitry is further configured to: encode a second packet including a transmit difference indicating a difference between the transmit power used to transmit the packet and a maximum transmit power the station could use to transmit the UL-PPDU.

In Example 14, the subject matter of any one or more of Examples 1-13 optionally include ax station.

In Example 15, the subject matter of any one or more of Examples 1-14 optionally include transceiver circuitry coupled to the memory, and, one or more antennas coupled to the transceiver circuitry.

Example 16 is a non-transitory computer-readable storage medium that stores instructions for execution by one or more processors, the instructions to configure the one or more processors to cause an apparatus of a station to: decode a trigger frame from an access point for an uplink communication, the trigger frame including an uplink resource allocation for the station, the uplink resource allocation including common information and per station information, the common information including an indication of a maximum receive power at the access point, the per station information including an identification of the station, and an indication of a resource unit (RU); encode an uplink (UL) physical layer convergence procedure (PLCP) protocol data unit (PPDU)(UL-PPDU) in accordance with the indication of the RU, determine a transmit power for the UL-PPDU based on the maximum receive power; and configure the wireless device to transmit the UL-PPDU using the determined transmit power.

In Example 17, the subject matter of Example 16 optionally includes where the instructions further configure the one or more processors to cause the apparatus to: determine a proportional maximum receive power based on one or both of: a first bandwidth of the RU divided by a second bandwidth of the uplink communication; and, a number of spatial stream allocated to the station divided by a total number of spatial streams for the uplink communication; and determine the transmit power for the packet based on the proportional maximum receive power.

In Example 18, the subject matter of any one or more of Examples 16-17 optionally include where the per wireless device information further comprises an indication of a modulation and coding scheme (MCS), and where the UL-PPDU is a trigger based (TB) (UL-PPDU)(UL-TB-PPDU), and where the instructions further configure the one or more processors to cause the apparatus to: encode the packet in accordance with the indication of the MCS.

In Example 19, the subject matter of Example 18 optionally includes where the instructions further configure the one or more processors to cause the apparatus to, determine the transmit power for the UL-TB-PPDU further based on the indication of the MCS and a signal-to-noise ratio for the MCS Example 20 is a method performed by an apparatus of a station, the method including: determining a transmit power to be used to transmit a physical layer convergence procedure (PLCP) protocol data unit (PPDU); encoding the PPDU to comprise a transmit difference indicating a difference between the transmit power used to transmit the packet and a maximum transmit power the station could use to transmit the PPDU; and configuring the station to transmit the PPDU using the determined transmit power.

In Example 21, the subject matter of Example 20 optionally includes where the method further comprises: determining the transmit power to be used to transmit the PPDU based on one or more of the following group: a maximum receive power at a receiver of the packet, a path loss from the station to the receiver of the packet, a maximum transmit power of the station, coexistence of another communication protocol with the station, a proximity detection, thermal conditions, static regulatory requirements, or a SAR.

Example 22 is an apparatus of an access point including: a memory; and processing circuitry couple to the memory, where the processing circuitry is configured to: encode a trigger frame for one or more stations for an uplink communication, the trigger frame including an uplink resource allocation for the one or more stations, the uplink resource allocation including common information and per station information, the common information including an indication of a maximum receive power at the access point, the per station information including an identification of a corresponding station of the one or more stations, and a resource unit (RU); configure the access point to transmit the trigger frame; decode one or more packets from the one or more stations, the one or more packets to be received in accordance with the corresponding RU, determine a receive power of each of the one or more packets; encode a second packet including feedback for the one or more stations based on the determined receive power of each of the one or more packets; and configure the access point to transmit the second packet to the one or more stations.

In Example 23, the subject matter of Example 22 optionally includes where the one or more packets comprise a transmit difference indicating a difference between the transmit power used to transmit a corresponding packet of the one or more packets and a maximum transmit power a corresponding station could use to transmit the packet.

In Example 24, the subject matter of Example 23 optionally includes where the processing circuitry is further configured to: determine a new maximum receive power based on the transmit difference from each of the one or more stations.

In Example 25, the subject matter of any one or more of Examples 22-24 optionally include where the processing circuitry is further configured to: determine a receive power for maximum transmit power for each of the one or more stations based on the transmit difference of a corresponding packet of the one or more packets and a received power of the corresponding packet at the access point.

Example 26 is an apparatus of a station including: means for decoding a trigger frame from an access point for an uplink communication, the trigger frame including an uplink resource allocation for the station, the uplink resource allocation including common information and per station information, the common information including an indication of a maximum receive power at the access point, the per station information including an identification of the station, and an indication of a resource unit (RU); means for encoding an uplink (UL) physical layer convergence procedure (PLCP) protocol data unit (PPDU)(UL-PPDU) in accordance with the indication of the RU; means for determining a transmit power for the UL-PPDU based on the maximum receive power; and means for configuring the wireless device to transmit the UL-PPDU using the determined transmit power.

In Example 27, the subject matter of Example 26 optionally includes means for determining a proportional maximum receive power based on one or both of: a first bandwidth of the RU divided by a second bandwidth of the uplink communication, and, a number of stations allocated RUs; and means for determining the transmit power for the packet based on the proportional maximum receive power.

In Example 28, the subject matter of any one or more of Examples 26-27 optionally include where the per wireless device information further comprises an indication of a modulation and coding scheme (MCS), and where the UL-PPDU is a trigger based (TB) (UL-PPDU)(UL-TB-PPDU), and where the processing circuitry is further configured to, encode the packet in accordance with the indication of the MCS.

In Example 29, the subject matter of Example 28 optionally includes means for determining the transmit power for the UL-TB-PPDU further based on the indication of the MCS and a signal-to-noise ratio for the MCS In Example 30, the subject matter of any one or more of Examples 28-29 optionally include means for decoding a second packet from the access point for a second uplink communication, the second packet including a second uplink resource allocation for the station, the second uplink resource allocation including second common information and second per station information, the second common information including a second indication of a maximum receive power at the access point, the second per station information including an indication of a received power of the UL-TB-PPDU at the access point, a second indication of a MCS, the identification of the station, and a second RU; means for encoding a second UL-TB-PPDU in accordance with the indication of the second MCS and the second RU: means for determining a second transmit power for the second UL-TB-PPDU based on the second indication of the maximum receive power and the indication of the received power of the UL-TB-PPDU at the access point; and means for configuring the wireless device to transmit the second UL-TB-PPDU using the determined second transmit power.

In Example 31, the subject matter of any one or more of Examples 26-30 optionally include means for encoding the UL-PPDU to comprise a transmit difference indicating a difference between the transmit power used to transmit the packet and a maximum transmit power the first wireless device could use to transmit the packet.

In Example 32, the subject matter of any one or more of Examples 26-31 optionally include means for decoding a frame from the access point including an indication of a received power of the UL-PPDU.

In Example 33, the subject matter of Example 32 optionally includes means for storing the indication of the received power of the UL-PPDU; and means for using the indication of the received power of the UL-PPDU to determine a second transmit power for a second UL-PPDU to be transmitted to the access point.

In Example 34, the subject matter of any one or more of Examples 32-33 optionally include where the common information further comprises an indication of a transmit power used to transmit the trigger frame.

In Example 35, the subject matter of Example 34 optionally includes means for determining a path loss based on the an indication of the transmit power used to transmit the trigger frame and a received power of the trigger frame at the station; and means for determining the transmit power for the packet further based on the path loss.

In Example 36, the subject matter of any one or more of Examples 26-35 optionally include means for determining the transmit power for the UL-PPDU based on a proportion of the RU to a total bandwidth, the total bandwidth indicated in the trigger frame or based determined based on a communication standard.

In Example 37, the subject matter of any one or more of Examples 26-36 optionally include where the UL-PPDU is a null data packet.

In Example 38, the subject matter of Example 37 optionally includes encode a second packet including a transmit difference indicating a difference between the transmit power used to transmit the packet and a maximum transmit power the station could use to transmit the UL-PPDU.

In Example 39, the subject matter of any one or more of Examples 26-38 optionally include ax station.

In Example 40, the subject matter of any one or more of Examples 26-39 optionally include means for processing received radio frequency signals; and, means for receiving radio frequency signals.

Example 41 is a non-transitory computer-readable storage medium that stores instructions for execution by one or more processors, the instructions to configure the one or more processors to cause an apparatus of an access point to: encode a trigger frame for one or more stations for an uplink communication, the trigger frame including an uplink resource allocation for the one or more stations, the uplink resource allocation including common information and per station information, the common information including an indication of a maximum receive power at the access point, the per station information including an identification of a corresponding station of the one or more stations, and a resource unit (RU), configure the access point to transmit the trigger frame; decode one or more packets from the one or more stations, the one or more packets to be received in accordance with the corresponding RU; determine a receive power of each of the one or more packets; encode a second packet including feedback for the one or more stations based on the determined receive power of each of the one or more packets; and configure the access point to transmit the second packet to the one or more stations.

In Example 42, the subject matter of Example 41 optionally includes where the one or more packets comprise a transmit difference indicating a difference between the transmit power used to transmit a corresponding packet of the one or more packets and a maximum transmit power a corresponding station could use to transmit the packet.

In Example 43, the subject matter of Example 42 optionally includes where the instructions further configure the one or more processors to cause the apparatus to: determine a new maximum receive power based on the transmit difference from each of the one or more stations.

In Example 44, the subject matter of any one or more of Examples 41-43 optionally include where the instructions further configure the one or more processors to cause the apparatus to: determine a receive power for maximum transmit power for each of the one or more stations based on the transmit difference of a corresponding packet of the one or more packets and a received power of the corresponding packet at the access point.

Example 45 is a method performed by an apparatus of an access point, the method including: encoding a trigger frame for one or more stations for an uplink communication, the trigger frame including an uplink resource allocation for the one or more stations, the uplink resource allocation including common information and per station information, the common information including an indication of a maximum receive power at the access point, the per station information including an identification of a corresponding station of the one or more stations, and a resource unit (RU); configuring the access point to transmit the trigger frame; decoding one or more packets from the one or more stations, the one or more packets to be received in accordance with the corresponding RU; determining a receive power of each of the one or more packets; encoding a second packet including feedback for the one or more stations based on the determined receive power of each of the one or more packets; and configuring the access point to transmit the second packet to the one or more stations.

In Example 46, the subject matter of Example 45 optionally includes where the one or more packets comprise a transmit difference indicating a difference between the transmit power used to transmit a corresponding packet of the one or more packets and a maximum transmit power a corresponding station could use to transmit the packet.

In Example 47, the subject matter of any one or more of Examples 45-46 optionally include the method further including: determining a new maximum receive power based on the transmit difference from each of the one or more stations.

In Example 48, the subject matter of any one or more of Examples 45-47 optionally include the method further including: determining a receive power for maximum transmit power for each of the one or more stations based on the transmit difference of a corresponding packet of the one or more packets and a received power of the corresponding packet at the access point.

Example 49 is an apparatus an access point, the apparatus including: means for encoding a trigger frame for one or more stations for an uplink communication, the trigger frame including an uplink resource allocation for the one or more stations, the uplink resource allocation including common information and per station information, the common information including an indication of a maximum receive power at the access point, the per station information including an identification of a corresponding station of the one or more stations, and a resource unit (RU); means for configuring the access point to transmit the trigger frame; means for decoding one or more packets from the one or more stations, the one or more packets to be received in accordance with the corresponding RU, means for determining a receive power of each of the one or more packets; means for encoding a second packet including feedback for the one or more stations based on the determined receive power of each of the one or more packets; and means for configuring the access point to transmit the second packet to the one or more stations.

In Example 50, the subject matter of Example 49 optionally includes where the one or more packets comprise a transmit difference indicating a difference between the transmit power used to transmit a corresponding packet of the one or more packets and a maximum transmit power a corresponding station could use to transmit the packet.

In Example 51, the subject matter of any one or more of Examples 49-50 optionally include the apparatus further including: means for determining a new maximum receive power based on the transmit difference from each of the one or more stations.

In Example 52, the subject matter of any one or more of Examples 49-51 optionally include the apparatus further including: means for determining a receive power for maximum transmit power for each of the one or more stations based on the transmit difference of a corresponding packet of the one or more packets and a received power of the corresponding packet at the access point.

Example 53 is an apparatus of a station including: a memory: and processing circuitry couple to the memory, where the processing circuitry is configured to: decode a trigger frame for an uplink communication including an uplink resource allocation for the station, the uplink resource allocation including common information and per station information, the common information including an indication of a noise floor level and an indication of a transmit power used to transmit the trigger frame, the per station information including an indication of a modulation and coding scheme (MCS), an identification of the station, and a resource unit; encode a trigger based (TB) physical layer convergence procedure (PLCP) protocol data unit (PPDU)

(TB-PPDU) in accordance with a MCS indicated by the indication of the MCS and the resource unit; determine a path loss based on a received signal strength of the trigger frame and the transmit power used to transmit the trigger frame; determine a transmit power to use to transmit the TB PPDU based on the path loss, the indication of the noise floor level, the indication of the MCS, and a signal to noise ratio; and configure the station to transmit the TB-PPDU using the determined transmit power.

In Example 54, the subject matter of Example 53 optionally includes where the processing circuitry is further configured to: before decode of the trigger frame, decode a frame from the master station, the frame including the signal to noise ratio for the MCS indicated by the indication of the MCS.

In Example 55, the subject matter of any one or more of Examples 53-54 optionally include where the indication of the noise floor level and the indication of the transmit power used to transmit the trigger frame are indicated together in a link margin.

In Example 56, the subject matter of any one or more of Examples 53-55 optionally include where the processing circuitry is further configured to: if the determined transmit power is above a threshold transmit power, determine a new reduced transmit power, and encode the TB-PPDU to comprise a transmit power difference indicating a difference between the determined transmit power and the reduced transmit power, and configure the station to transmit the TB-PPDU using the reduced transmit power.

In Example 57, the subject matter of Example 56 optionally includes where the threshold is based on one or more of the following group: a coexistence second wireless communication protocol, a proximity detection, thermal conditions, static regulatory requirements, and a specific absorption rate (SAR).

In Example 58, the subject matter of any one or more of Examples 53-57 optionally include where the processing circuitry is further configured to: if the determined transmit power is below a threshold transmit power, determine a new increased transmit power, and encode the TB-PPDU to comprise a transmit power difference indicating a difference between the determined transmit power and the increased transmit power, and configure the station to transmit the TB-PPDU using the increased transmit power.

In Example 59, the subject matter of any one or more of Examples 53-58 optionally include where the processing circuitry is further configured to: determine to decrease the MCS indicated by the indication of the MCS based on one or more of the following group: the determined transmit power to use to transmit the TB-PPDU, the indication of the noise floor level, the indication of the MCS, and a signal-to-noise ratio for the MCS.

In Example 60, the subject matter of any one or more of Examples 53-59 optionally include where the processing circuitry is further configured to: determine the transmit power to use to transmit the TB-PPDU based on the path loss, the indication of the noise floor level, the indication of the MCS, and a signal-to-noise ratio for the MCS, where the determined transmit power is set to a level so that the TB-PPDU is received at a second wireless device with the signal-to-noise ratio.

In Example 61, the subject matter of Example 60 optionally includes where the processing circuitry is further configured to: adjust the transmit power based on a bandwidth of the resource unit compared with a fill bandwidth.

In Example 62, the subject matter of any one or more of Examples 53-61 optionally include where the processing circuitry is further configured to: decode a packet including a table indicating a signal-to-noise ratio for each of a plurality of MCSs select the signal-to-noise ratio for the MCS using the table; and determine the transmit power to use to transmit the TB PPDU based on the path loss, the indication of the noise floor level, the indication of the MCS, and the signal-to-noise ratio.

In Example 63, the subject matter of Example 62 optionally includes where the processing circuitry is further configured to: if a time period between receiving the table and receiving the trigger frame is greater than a threshold, then select the signal-to-noise ratio for the MCS using a default table.

In Example 64, the subject matter of any one or more of Examples 53-63 optionally include where the per station information further comprises the signal-to-noise ratio for the MCS.

In Example 65, the subject matter of any one or more of Examples 53-64 optionally include where processing circuitry is further configured to: determine to decrease the MCS indicated by the indication of the MCS and the resource unit based on a determination that the signal-to-noise ratio at an access point will be too low for the MCS if the determined transmit power is used to transmit the TB-PPDU.

In Example 66, the subject matter of any one or more of Examples 53-65 optionally include ax station.

In Example 67, the subject matter of any one or more of Examples 53-66 optionally include transceiver circuitry coupled to the memory; and, one or more antennas coupled to the transceiver circuitry.

Example 68 is a non-transitory computer-readable storage medium that stores instructions for execution by one or more processors, the instructions to configure the one or more processors to cause a wireless device to: decode a trigger frame for an uplink communication including an uplink resource allocation for the station, the uplink resource allocation including common information and per station information, the common information including an indication of a noise floor level and an indication of a transmit power used to transmit the trigger frame, the per station information including an indication of a modulation and coding scheme (MCS), an identification of the station, and a resource unit; encode a trigger based (TB) physical layer convergence procedure (PLCP) protocol data unit (PPDU)(TB-PPDU) in accordance with a MCS indicated by the indication of the MCS and the resource unit, determine a path loss based on a received signal strength of the trigger frame and the transmit power used to transmit the trigger frame; determine a transmit power to use to transmit the TB PPDU based on the path loss, the indication of the noise floor level, the indication of the MCS, and a signal to noise ratio; and configure the station to transmit the TB-PPDU using the determined transmit power.

In Example 69, the subject matter of Example 68 optionally includes where the indication of the noise floor level and the transmit power used to transmit the trigger frame are indicated together in a link margin.

In Example 70, the subject matter of any one or more of Examples 68-69 optionally include where the processing circuitry is further configured to: before decode of the trigger frame, decode a frame from the master station, the frame including the signal to noise ratio for the MCS indicated by the indication of the MCS.

Example 71 is a method performed by an apparatus of a wireless device, the method including: decoding a trigger frame for an uplink communication including an uplink resource allocation for the station, the uplink resource allocation including common information and per station information, the common information including an indication of a noise floor level and an indication of a transmit power used to transmit the trigger frame, the per station information including an indication of a modulation and coding scheme (MCS), an identification of the station, and a resource unit; encoding a trigger based (TB) physical layer convergence procedure (PLCP) protocol data unit (PPDU)(TB-PPDU) in accordance with a MCS indicated by the indication of the MCS and the resource unit; determining a path loss based on a received signal strength of the trigger frame and the transmit power used to transmit the trigger frame; determining a transmit power to use to transmit the TB PPDU based on the path loss, the indication of the noise floor level, the indication of the MCS, and a signal to noise ratio; and configuring the station to transmit the TB-PPDU using the determined transmit power.

In Example 72, the subject matter of Example 71 optionally includes the method further including: before decoding of the trigger frame, decoding a frame from the master station, the frame including the signal to noise ratio for the MCS indicated by the indication of the MCS.

Example 73 is an apparatus of an access point including: a memory; and processing circuitry couple to the memory, where the processing circuitry is configured to: encode a trigger frame for an uplink communication including an uplink resource allocation for one or more stations, the uplink resource allocation including common information and per station information, the common information including an indication of a noise floor level at the access point and an indication of a transmit power to be used to transmit the trigger frame, the per station information including an indication of a modulation and coding scheme (MCS), a station identification, and a resource unit; configure the wireless device to transmit the trigger frame; and decode one or more packets from the one or more stations, where each packet is encoded with the MCS indicated in the per station information, and where the one or more packets are to be received in accordance with one or both of orthogonal frequency division multiple-access (OFDMA) or multi-user multiple-input multiple-output (MU-MIMO).

In Example 74, the subject matter of Example 73 optionally includes where the processing circuitry is further configured to: encode a frame for a station of the one or more stations, the frame including one or more signal-to-noise ratio (SNR) value to MCS value pairs, the SNR indicating a target SNR for packets transmitted by the station to the access point encoded with the MCS value.

In Example 75, the subject matter of any one or more of Examples 73-74 optionally include where the processing circuitry is further configured to: determine the one or more SNR value to MCS value pairs based on an error level in receiving the one or more packets.

In Example 76, the subject matter of any one or more of Examples 73-75 optionally include where the per station information further comprises a signal-to-noise ratio for the MCS.

In Example 77, the subject matter of any one or more of Examples 73-76 optionally include where at least one packet of the one or more packets further comprises a deviation indication, the deviation indication indicating a difference between the transmit power for the uplink communication determined by the station that transmitted the at least one packet and an actual transmit power used to transmit the at least packet.

In Example 78, the subject matter of any one or more of Examples 73-77 optionally include where the indication of the noise floor level at the access point, the indication of the transmit power to be used to transmit the trigger frame, the indication of the MCS, and a signal-to-noise ratio (SNR) values configure the one or more stations to determine a transmit power for the uplink communication.

In Example 79, the subject matter of any one or more of Examples 73-78 optionally include ax station.

In Example 80, the subject matter of any one or more of Examples 73-79 optionally include transceiver circuitry coupled to the memory; and, one or more antennas coupled to the transceiver circuitry.

Example 81 is an apparatus of a station including: means for decoding a trigger frame for an uplink communication including an uplink resource allocation for the station, the uplink resource allocation including common information and per station information, the common information including an indication of a noise floor level and an indication of a transmit power used to transmit the trigger frame, the per station information including an indication of a modulation and coding scheme (MCS), an identification of the station, and a resource unit; means for encoding a trigger based (TB) physical layer convergence procedure (PLCP) protocol data unit (PPDU)(TB-PPDU) in accordance with a MCS indicated by the indication of the MCS and the resource unit; means for determining a path loss based on a received signal strength of the trigger frame and the transmit power used to transmit the trigger frame; means for determining a transmit power to use to transmit the TB PPDU based on the path loss, the indication of the noise floor level, the indication of the MCS, and a signal to noise ratio, and means for configuring the station to transmit the TB-PPDU using the determined transmit power.

In Example 82, the subject matter of Example 81 optionally includes before decode of the trigger frame, means for decoding a frame from the master station, the frame including the signal to noise ratio for the MCS indicated by the indication of the MCS.

In Example 83, the subject matter of any one or more of Examples 81-82 optionally include where the indication of the noise floor level and the indication of the transmit power used to transmit the trigger frame are indicated together in a link margin.

In Example 84, the subject matter of any one or more of Examples 81-83 optionally include if the determined transmit power is above a threshold transmit power, means for determining a new reduced transmit power, and means for encoding the TB-PPDU to comprise a transmit power difference indicating a difference between the determined transmit power and the reduced transmit power, and configure the station to transmit the TB-PPDU using the reduced transmit power.

In Example 85, the subject matter of Example 84 optionally includes where the threshold is based on one or more of the following group: a coexistence second wireless communication protocol, a proximity detection, thermal conditions, static regulatory requirements, and a specific absorption rate (SAR).

In Example 86, the subject matter of any one or more of Examples 81-85 optionally include if the determined transmit power is below a threshold transmit power, means for determining a new increased transmit power, and means for encoding the TB-PPDU to comprise a transmit power difference indicating a difference between the determined transmit power and the increased transmit power, and configure the station to transmit the TB-PPDU using the increased transmit power.

In Example 87, the subject matter of any one or more of Examples 81-86 optionally include means for determining to decrease the MCS indicated by the indication of the MCS based on one or more of the following group: the determined transmit power to use to transmit the TB-PPDU, the indication of the noise floor level, the indication of the MCS, and a signal-to-noise ratio for the MCS.

In Example 88, the subject matter of any one or more of Examples 81-87 optionally include means for determining the transmit power to use to transmit the TB-PPDU based on the path loss, the indication of the noise floor level, the indication of the MCS, and a signal-to-noise ratio for the MCS, where the determined transmit power is set to a level so that the TB-PPDU is received at a second wireless device with the signal-to-noise ratio.

In Example 89, the subject matter of any one or more of Examples 81-88 optionally include means for adjusting the transmit power based on a bandwidth of the resource unit compared with a full bandwidth.

In Example 90, the subject matter of any one or more of Examples 81-89 optionally include means for decoding a packet including a table indicating a signal-to-noise ratio for each of a plurality of MCSs; means for selecting the signal-to-noise ratio for the MCS using the table, and means for determining the transmit power to use to transmit the TB PPDU based on the path loss, the indication of the noise floor level, the indication of the MCS, and the signal-to-noise ratio.

In Example 91, the subject matter of any one or more of Examples 83-90 optionally include if a time period between receiving the table and receiving the trigger frame is greater than a threshold, means for selecting the signal-to-noise ratio for the MCS using a default table.

In Example 92, the subject matter of any one or more of Examples 83-91 optionally include where the per station information further comprises the signal-to-noise ratio for the MCS.

In Example 93, the subject matter of any one or more of Examples 83-92 optionally include means for determining to decrease the MCS indicated by the indication of the MCS and the resource unit based on a determination that the signal-to-noise ratio at an access point will be too low for the MCS if the determined transmit power is used to transmit the TB-PPDU.

In Example 94, the subject matter of any one or more of Examples 83-93 optionally include ax station.

In Example 95, the subject matter of any one or more of Examples 83-94 optionally include means for processing radio frequency signals; and, means for receiving radio frequency signals.

Example 96 is a non-transitory computer-readable storage medium that stores instructions for execution by one or more processors, the instructions to configure the one or more processors to cause an apparatus of an access point to: encode a trigger frame for an uplink communication including an uplink resource allocation for one or more stations, the uplink resource allocation including common information and per station information, the common information including an indication of a noise floor level at the access point and an indication of a transmit power to be used to transmit the trigger frame, the per station information including an indication of a modulation and coding scheme (MCS), a station identification, and a resource unit; configure the wireless device to transmit the trigger frame, and decode one or more packets from the one or more stations, where each packet is encoded with the MCS indicated in the per station information, and where the one or more packets are to be received in accordance with one or both of orthogonal frequency division multiple-access (OFDMA) or multi-user multiple-input multiple-output (MU-MIMO).

In Example 97, the subject matter of Example 96 optionally includes where the instructions further configure the one or more processors to cause the apparatus to: encode a frame for a station of the one or more stations, the frame including one or more signal-to-noise ratio (SNR) value to MCS value pairs, the SNR indicating a target SNR for packets transmitted by the station to the access point encoded with the MCS value.

In Example 98, the subject matter of any one or more of Examples 96-97 optionally include where the processing circuitry is further configured to: determine the one or more SNR value to MCS value pairs based on an error level in receiving the one or more packets.

In Example 99, the subject matter of any one or more of Examples 96-98 optionally include where the per station information further comprises a signal-to-noise ratio for the MCS.

In Example 100, the subject matter of any one or more of Examples 96-99 optionally include where at least one packet of the one or more packets further comprises a deviation indication, the deviation indication indicating a difference between the transmit power for the uplink communication determined by the station that transmitted the at least one packet and an actual transmit power used to transmit the at least packet.

In Example 101, the subject matter of any one or more of Examples 96-100 optionally include where the indication of the noise floor level at the access point, the indication of the transmit power to be used to transmit the trigger frame, the indication of the MCS, and a signal-to-noise ratio (SNR) values configure the one or more stations to determine a transmit power for the uplink communication.

In Example 102, the subject matter of any one or more of Examples 96-101 optionally include ax station.

Example 103 is a method performed by an apparatus of an access point, the method including: encoding a trigger frame for an uplink communication including an uplink resource allocation for one or more stations, the uplink resource allocation including common information and per station information, the common information including an indication of a noise floor level at the access point and an indication of a transmit power to be used to transmit the trigger frame, the per station information including an indication of a modulation and coding scheme (MCS), a station identification, and a resource unit; configuring the wireless device to transmit the trigger frame; and decoding one or more packets from the one or more stations, where each packet is encoded with the MCS indicated in the per station information, and where the one or more packets are to be received in accordance with one or both of orthogonal frequency division multiple-access (OFDMA) or multi-user multiple-input multiple-output (MU-MIMO).

In Example 104, the subject matter of Example 103 optionally includes where the instructions further configure the one or more processors to cause the apparatus to: encode a frame for a station of the one or more stations, the frame including one or more signal-to-noise ratio (SNR) value to MCS value pairs, the SNR indicating a target SNR for packets transmitted by the station to the access point encoded with the MCS value.

In Example 105, the subject matter of any one or more of Examples 103-104 optionally include the method further including: determining the one or more SNR value to MCS value pairs based on an error level in receiving the one or more packets.

In Example 106, the subject matter of any one or more of Examples 103-105 optionally include where the per station information further comprises a signal-to-noise ratio for the MCS.

In Example 107, the subject matter of any one or more of Examples 103-106 optionally include where at least one packet of the one or more packets further comprises a deviation indication, the deviation indication indicating a difference between the transmit power for the uplink communication determined by the station that transmitted the at least one packet and an actual transmit power used to transmit the at least packet.

In Example 108, the subject matter of any one or more of Examples 103-107 optionally include where the indication of the noise floor level at the access point, the indication of the transmit power to be used to transmit the trigger frame, the indication of the MCS, and a signal-to-noise ratio (SNR) values configure the one or more stations to determine a transmit power for the uplink communication.

In Example 109, the subject matter of any one or more of Examples 104-108 optionally include ax station.

Example 110 is an apparatus of an access point, the apparatus including: means for encoding a trigger frame for an uplink communication including an uplink resource allocation for one or more stations, the uplink resource allocation including common information and per station information, the common information including an indication of a noise floor level at the access point and an indication of a transmit power to be used to transmit the trigger frame, the per station information including an indication of a modulation and coding scheme (MCS), a station identification, and a resource unit; means for configuring the wireless device to transmit the trigger frame; and means for decoding one or more packets from the one or more stations, where each packet is encoded with the MCS indicated in the per station information, and where the one or more packets are to be received in accordance with one or both of orthogonal frequency division multiple-access (OFDMA) or multi-user multiple-input multiple-output (MU-MIMO).

In Example 111, the subject matter of Example 110 optionally includes the apparatus further including: means for encoding a frame for a station of the one or more stations, the frame including one or more signal-to-noise ratio (SNR) value to MCS value pairs, the SNR indicating a target SNR for packets transmitted by the station to the access point encoded with the MCS value.

In Example 112, the subject matter of any one or more of Examples 110-111 optionally include the apparatus further including: means for determining the one or more SNR value to MCS value pairs based on an error level in receiving the one or more packets.

In Example 113, the subject matter of any one or more of Examples 110-112 optionally include where the per station information further comprises a signal-to-noise ratio for the MCS.

In Example 114, the subject matter of any one or more of Examples 110-113 optionally include where at least one packet of the one or more packets further comprises a deviation indication, the deviation indication indicating a difference between the transmit power for the uplink communication determined by the station that transmitted the at least one packet and an actual transmit power used to transmit the at least packet.

In Example 115, the subject matter of any one or more of Examples 110-114 optionally include where the indication of the noise floor level at the access point, the indication of the transmit power to be used to transmit the trigger frame, the indication of the MCS, and a signal-to-noise ratio (SNR) values configure the one or more stations to determine a transmit power for the uplink communication.

In Example 116, the subject matter of any one or more of Examples 110-115 optionally include ax station.

The Abstract is provided to comply with 37 C.F.R. Section 1.72(b) requiring an abstract that will allow, the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station (STA), the apparatus comprising: memory; and, processing circuitry coupled to the memory, the processing circuitry configured to:
    decode a trigger frame comprising a received signal strength indicator (RSSI) subfield, the RSSI subfield indicating a desired received signal power of a HE trigger-based Physical Layer Convergence Protocol (PLCP) Protocol Data Unit (PPDU) response, the trigger frame further comprising a modulation and coding scheme (MCS) subfield for the HE trigger-based PPDU response and an access point (AP) transmit power subfield indicating a transmit power used by the HE AP to transmit the trigger frame;
    determine a path loss based on the AP transmit power and a measured received signal strength of the trigger frame;
    determine a transmit power (TxP) to use to transmit the HE trigger-based PPDU response based on the determined path loss and a value of the RSSI subfield;
    determine an uplink power headroom to be equal to a maximum TxP of the HE STA for the MCS minus the TxP for the MCS, wherein the uplink power headroom indicates an amount of headroom above the TxP available to the HE STA to transmit the HE trigger-based PPDU response; and
    encode the HE trigger-based PPDU response in accordance with a value of the MCS subfield and the HE trigger-based PPDU response to comprise a subfield indicating the uplink power headroom.

2. The apparatus of claim 1, wherein the subfield indicating the uplink power headroom indicates a number of decibels (dBs) above the TxP that is available to the HE STA to transmit the HE trigger-based PPDU response for the MCS and for the HE trigger-based PPDU response.

3. The apparatus of claim 2, wherein the number of dBs above the TxP that is available to the HE STA to transmit the HE trigger-based PPDU is based on one or more of the following group: a hardware capability of the HE STA, a regulatory requirement, and one or more co-existent wireless protocols on the HE STA.

4. The apparatus of claim 1, wherein the transmit power used by the HE AP is part of a common information field and the RSSI subfield and the MCS subfield are part of a per user information field.

5. The apparatus of claim 1, wherein the processing circuitry is further configured to:
determine the path loss based on the AP transmit power and a measured received signal strength of a legacy preamble portion of the trigger frame.

6. The apparatus of claim 1, wherein the desired RSSI subfield indicates a target received signal power of the HE trigger-based PPDU response.

7. The apparatus of claim 1, wherein the processing circuitry is further configured to:
determine a path loss based on the AP transmit power level minus a measured received signal strength of the trigger frame, wherein the AP transmit power level is a first value represented in dBs, and the measure received signal strength of the trigger frame is a second value represented in dBs, and wherein the subtraction is performed in accordance with the dBs being a logarithm base 10 of a power level.

8. The apparatus of claim 1, wherein the processing circuitry is further configured to:
determine a transmit power (TxP) to use to transmit the HE trigger-based PPDU response based on the determined path loss, the value of the RSSI subfield, and the MCS for the HE trigger-based PPDU response; and
determine the uplink power headroom indicating the amount of headroom above the TxP available to the HE STA to transmit the HE trigger-based PPDU response for the MCS for the HE trigger-based PPDU response.

9. The apparatus of claim 1, wherein the HE STA and the HE AP are each one of the following group: a HE STA and a HE AP.

10. The apparatus of claim 1, wherein the processing circuitry is further configured to:
configure the HE STA to transmit the HE trigger based PPDU response in accordance with the determined TxP.

11. The apparatus of claim 1, wherein the processing circuitry is further configured to:
determine the headroom based on one or more of the following group: one or more co-existent wireless protocols on the HE STA, one or more regulatory standards, one or more static regulatory standards, an error vector magnitude for the MCS, a transmission mask requirement, a proximity detection, thermal conditions, a specific absorption rate, and a transmission power limit of the HE STA.

12. The apparatus of claim 1, wherein the HE STA and the HE AP are configured to operate in accordance with Institute of Electrical and Electronic Engineers (IEEE) 802.11ax.

13. The apparatus of claim 1, further comprising transceiver circuitry coupled to the processing circuitry; and, one or more antennas coupled to the transceiver circuitry.

14. A non-transitory computer-readable storage medium that stores instructions for execution by one or more processors, the instructions to configure the one or more processors to cause an apparatus of a high-efficiency (HE) station (STA) to:
decode a trigger frame comprising a received signal strength indicator (RSSI) subfield, the received RSSI subfield indicating a desired received signal power of a HE trigger-based Physical Layer Convergence Protocol (PLCP) Protocol Data Unit (PPDU) response, the trigger frame further comprising a modulation and coding scheme (MCS) subfield for the HE trigger-based PPDU response and an access point (AP) transmit power subfield indicating a transmit power level used by the HE AP to transmit the trigger frame;
determine a path loss based on the AP transmit power level and a measured received signal strength of the trigger frame;
determine a transmit power (TxP) to use to transmit the HE trigger-based PPDU response based on the determined path loss and a value of the goal RSSI subfield;
determine an uplink power headroom to be equal to a maximum TxP of the HE STA for the MCS minus the TxP for the MCS, wherein the uplink power headroom indicates an amount of headroom above the TxP available to the HE STA to transmit the HE trigger-based PPDU response; and
encode the HE trigger-based PPDU response in accordance with a value of the MCS subfield and the HE trigger-based PPDU response to comprise a subfield indicating the uplink power headroom.

15. The non-transitory computer-readable storage medium of claim 14, wherein the desired RSSI subfield indicates a target received signal power of the HE trigger-based PPDU response.

16. The non-transitory computer-readable storage medium of claim 14, wherein the subfield indicating the uplink power headroom indicates a number of decibels (dBs) above the TxP that is available to the HE STA to transmit the HE trigger-based PPDU response for the MCS for the HE trigger-based PPDU response.

17. The non-transitory computer-readable storage medium of claim 16, wherein the number of dBs above the TxP that is available to the HE STA to transmit the HE trigger-based PPDU is based on one or more of the following group: a hardware capability of the HE STA, a regulatory requirement, and one or more co-existent wireless protocols on the HE STA.

18. The non-transitory computer-readable storage medium of claim 16, wherein the transmit power used by the HE AP is part of a common information field and the RSSI subfield and the MCS are part of a per user information field.

19. A method performed by an apparatus of an high-efficiency (HE) station (STA), the method comprising:
decoding a trigger frame comprising a received signal strength indicator (RSSI) subfield, the RSSI subfield indicating a desired received signal power of a HE trigger-based Physical Layer Convergence Protocol (PLCP) Protocol Data Unit (PPDU) response, the trigger frame further comprising a modulation and coding scheme (MCS) subfield for the HE trigger-based PPDU response and an access point (AP) transmit power subfield indicating a transmit power level used by the HE AP to transmit the trigger frame;
determining a path loss based on the AP transmit power level and a measured received signal strength of the trigger frame;
determining a transmit power (TxP) to use to transmit the HE trigger-based PPDU response based on the determined path loss and a value of the RSSI subfield;
determine an uplink power headroom to be equal to a maximum TxP of the HE STA for the MCS minus the TxP for the MCS, wherein the uplink power headroom indicates an amount of headroom above the TxP available to the HE STA to transmit the HE trigger-based PPDU response; and
encoding the HE trigger-based PPDU response in accordance with a value of the MCS subfield and the HE trigger-based PPDU response to comprise a subfield indicating the uplink power headroom.

20. The method of claim 19, wherein the subfield indicating the uplink power headroom indicates a number of decibels (dBs) above the TxP that is available to the HE STA to transmit the HE trigger-based PPDU response for the MCS for the HE trigger-based PPDU response.

21. An apparatus of high-efficiency (HE) access point (AP), the apparatus comprising: memory; and, processing circuitry coupled to the memory, the processing circuitry configured to:
- encode a trigger frame for a plurality of HE stations (STAs), the trigger frame comprising a received signal strength indicator (RSSI) field for each HE STA, each RSSI field indicating a desired received signal power at the HE AP of a HE trigger-based Physical Layer Convergence Protocol (PLCP) Protocol Data Unit (PPDU) response to be transmitted by each of the plurality of HE STAs in response to the trigger frame, the trigger frame further comprising a modulation and coding scheme (MCS) indicating a MCS to be used by each HE STA of the plurality of HE STAs to encode a corresponding HE trigger-based PPDU response, and further encode the trigger frame to comprise a first transmit power (TxP) to be used to transmit the trigger frame; and
- decode a plurality of HE trigger-based PPDU responses in accordance with a corresponding MCS, each HE trigger-based PPDU response comprising a headroom indicating a number of decibels (dBs) above a corresponding second TxP used by a corresponding HE STA to transmit a corresponding HE trigger-based PPDU that is available to the corresponding HE STA to transmit the corresponding HE trigger-based PPDU for the corresponding MCS.

22. The apparatus of claim 21, wherein the processing circuitry is further configured to:
- determine a second RSSI value for a second trigger frame for each of the plurality of HE STAs based on the second RSSIs and the headroom of each of the HE trigger-based PPDU responses of the plurality of HE trigger-based PPDU responses.

23. The apparatus of claim 22, wherein the processing circuitry is further configured to:
- encode a second trigger frame for the plurality of HE stations (STAs), the second trigger frame comprising second RSSI field for each HE STA, each second RSSI field indicating the desired received signal power at the HE AP of a second HE trigger-based PPDU to be transmitted by each of the plurality of HE STAs in response to the second trigger frame, the second trigger frame further comprising a second MCS indicating a second MCS to be used by each HE STA of the plurality of HE STAs to encode a corresponding second HE trigger-based PPDU, and further encode the second trigger frame to comprise a third TxP to be used to transmit the second trigger frame.

24. The apparatus of claim 21, wherein each of the HE STA of the plurality of HE STAs and the HE AP are configured to operate in accordance with Institute of Electrical and Electronic Engineers (IEEE) 802.11ax.

25. The apparatus of claim 21, further comprising transceiver circuitry coupled to the processing circuitry; and, one or more antennas coupled to the transceiver circuitry.

\* \* \* \* \*